United States Patent
Kaino

(10) Patent No.: US 11,501,461 B2
(45) Date of Patent: Nov. 15, 2022

(54) CONTROLLER, CONTROL METHOD, AND PROGRAM

(71) Applicant: Sony Corporation, Tokyo (JP)

(72) Inventor: Akihiko Kaino, Tokyo (JP)

(73) Assignee: SONY CORPORATION, Tokyo (JP)

( * ) Notice: Subject to any disclaimer, the term of this patent is extended or adjusted under 35 U.S.C. 154(b) by 126 days.

(21) Appl. No.: 17/040,059

(22) PCT Filed: Mar. 15, 2019

(86) PCT No.: PCT/JP2019/010760
§ 371 (c)(1),
(2) Date: Sep. 22, 2020

(87) PCT Pub. No.: WO2019/188391
PCT Pub. Date: Oct. 3, 2019

(65) Prior Publication Data
US 2021/0027486 A1    Jan. 28, 2021

(30) Foreign Application Priority Data

Mar. 29, 2018 (JP) .............................. JP2018-063750

(51) Int. Cl.
*G06T 7/73* (2017.01)
*G06T 7/246* (2017.01)
(Continued)

(52) U.S. Cl.
CPC .............. *G06T 7/73* (2017.01); *G05D 1/0038* (2013.01); *G05D 1/0251* (2013.01); *G06T 7/246* (2017.01); *G06T 2207/30244* (2013.01)

(58) Field of Classification Search
CPC ........... G06T 7/20; G06T 7/246; G06T 7/292; G06T 7/70; G06T 7/73; G06T 7/97;
(Continued)

(56) References Cited

U.S. PATENT DOCUMENTS

2017/0206666 A1*  7/2017  Homma et al. ......... G06F 3/017
2018/0115711 A1*  4/2018  Kato et al. ................ G06T 7/73
(Continued)

FOREIGN PATENT DOCUMENTS

| JP | 2016-045874 A | 4/2016 |
| JP | 2016-197083 A | 11/2016 |
| WO | 2017/057052 A1 | 4/2017 |

OTHER PUBLICATIONS

International Search Report and Written Opinion dated May 28, 2019 for PCT/JP2019/010760 filed on Mar. 15, 2019, 9 pages including English Translation of the International Search Report.

*Primary Examiner* — Andrew W Johns
(74) *Attorney, Agent, or Firm* — Xsensus LLP

(57) ABSTRACT

The present technology relates to a controller, a control method, and a program that enable self-localization with lower power consumption.

Provided are a selection unit that selects, from a horizontal camera mounted in a horizontal direction and a downward camera mounted in a downward direction, a camera used for self-localization depending on speed, and a self-localization unit that performs self-localization using an image obtained by imaging with the horizontal camera or the downward camera selected by the selection unit. The selection unit selects the horizontal camera in a case where the speed is equal to or higher than a predetermined speed, and selects the downward camera in a case where the speed is not equal to or higher than the predetermined speed. The present technology can be applied to a self-localization system.

8 Claims, 11 Drawing Sheets

(51) Int. Cl.
*G05D 1/00* (2006.01)
*G05D 1/02* (2020.01)

(58) Field of Classification Search
CPC .......... G06T 2207/30244; G06V 20/56; G06V 20/58; G06V 20/582; G06V 20/584; G06V 20/586; G06V 20/588; G06K 9/00; G05D 1/0231; G05D 1/0246; G05D 1/0251; G05D 1/0253
See application file for complete search history.

(56) References Cited

U.S. PATENT DOCUMENTS

2018/0266830 A1* 9/2018 Kato et al. .............. G06T 7/593
2018/0268566 A1* 9/2018 Houts et al. ............ G01S 17/86

* cited by examiner

CONTROLLER, CONTROL METHOD, AND PROGRAM

CROSS-REFERENCE TO RELATED APPLICATIONS

The present application is based on PCT filing PCT/JP2019/010760, filed Mar. 15, 2019, which claims priority to JP 2018-063750, filed Mar. 29, 2018, the entire contents of each are incorporated herein by reference.

TECHNICAL FIELD

The present technology relates to a controller, a control method, and a program, and, for example, relates to a controller, a control method, and a program that enable accurate self-localization with low power consumption.

BACKGROUND ART

Conventionally, in self-localization where the location of a camera in real space is estimated on the basis of images captured by the camera, the gradient and feature points which are indices included in the images, for example, are used to estimate the self-location of the camera (for example, see Patent Document 1). Additionally, by using multiple cameras, it is possible to reduce a so-called blind spot that is an area not observed by the camera. Hence, it has also been proposed to avoid a situation in which no feature point is detected from an image.

CITATION LIST

Patent Document

Patent Document 1: Japanese Patent Application Laid-Open No. 2009-237848

SUMMARY OF THE INVENTION

Problems to be Solved by the Invention

However, if an image of the surrounding environment is constantly captured by multiple cameras, power consumption increases as the number of cameras used for self-localization increases. In particular, since power consumption is directly proportional to the number of cameras, it is desired to keep the power consumption for self-localization low.

The present technology has been made in view of such a situation, and enables reliable self-localization with less power consumption.

Solutions to Problems

A controller of one aspect of the present technology includes a selection unit that selects, from a horizontal camera mounted in a horizontal direction and a downward camera mounted in a downward direction, a camera used for self-localization depending on speed, and a self-localization unit that performs self-localization using an image obtained by imaging with the horizontal camera or the downward camera selected by the selection unit.

In a control method of one aspect of the present technology, a controller performs selection processing between a horizontal camera mounted in a horizontal direction and a downward camera mounted in a downward direction to select a camera used for self-localization depending on speed, and performs self-localization processing using an image obtained by imaging with the horizontal camera or the downward camera selected by the selection unit.

A program of one aspect of the present technology causes a computer to perform processing including selecting, from a horizontal camera mounted in a horizontal direction and a downward camera mounted in a downward direction, a camera used for self-localization depending on speed, and performing self-localization using an image obtained by imaging with the horizontal camera or the downward camera selected by the selection unit.

In the controller, the control method, and the program according to one aspect of the present technology, a camera used for self-localization depending on speed is selected from a horizontal camera mounted in a horizontal direction and a downward camera mounted in a downward direction, and self-localization is performed using an image obtained by imaging with the selected horizontal camera or the downward camera.

Note that the controller may be an independent device, or may be an internal block included in one device.

Additionally, the program can be provided by being transmitted through a transmission medium or being recorded on a recording medium.

Effects of the Invention

One aspect of the present technology enables reliable self-localization with lower power consumption.

Note that the effect described herein is not necessarily limited, and the effect may be any of those described in the present disclosure.

MODE FOR CARRYING OUT THE INVENTION

Hereinafter, a mode for carrying out the present technology (hereinafter referred to as embodiment) will be described.

Figure 1:
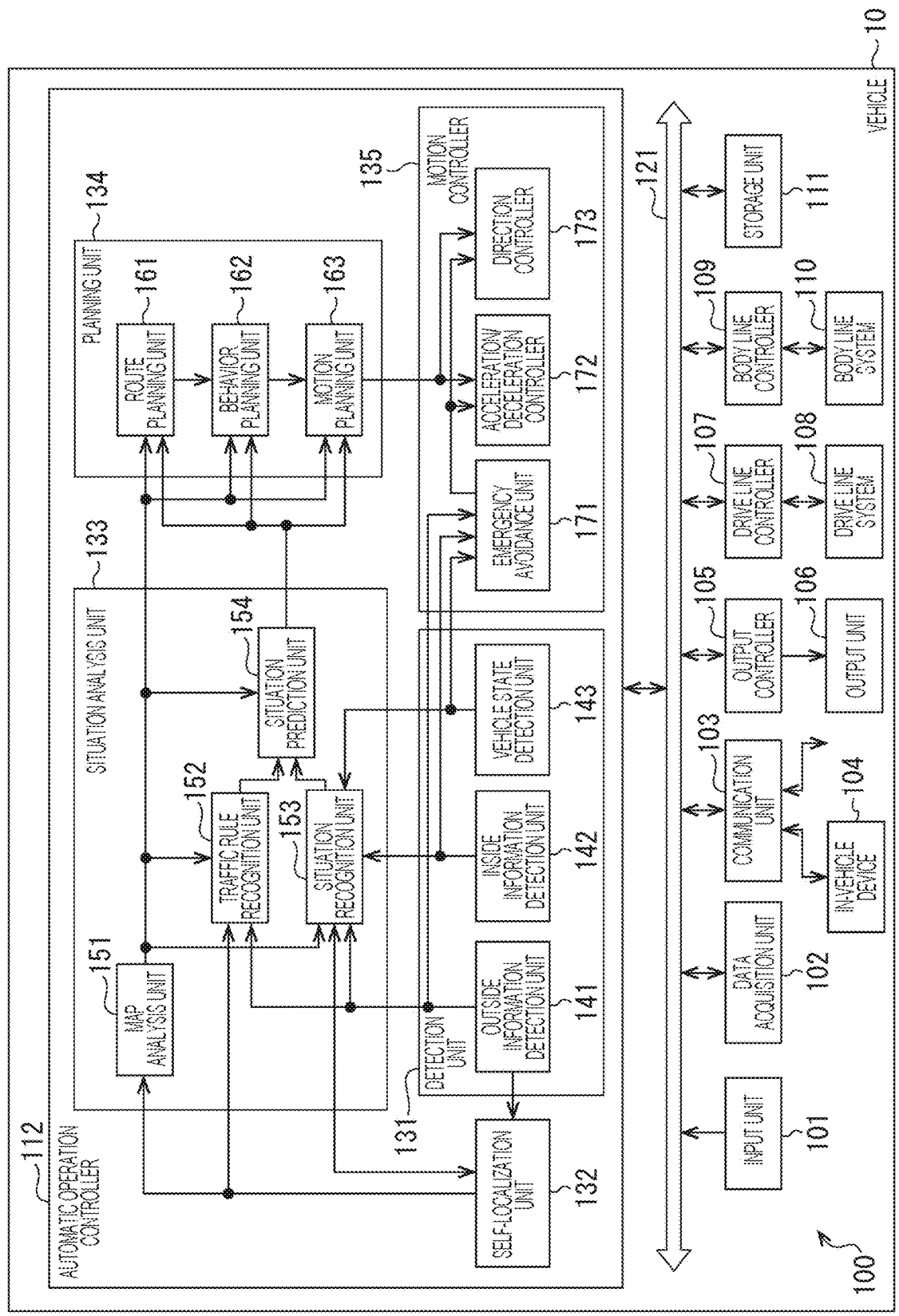
FIG. 1 is a diagram showing a configuration of an embodiment of a mobile control system to which the present technology is applied.

FIG. 1 is a block diagram showing a schematic functional configuration example of a vehicle control system 100 which is an example of a mobile control system to which the present technology can be applied.

The vehicle control system 100 is a system that is provided in a vehicle 10, and performs various control of the vehicle 10. Note that, hereinafter, when distinguishing the vehicle 10 from other vehicles, the vehicle 10 is referred to as the vehicle.

The vehicle control system 100 includes an input unit 101, a data acquisition unit 102, a communication unit 103, in-vehicle device 104, an output controller 105, an output unit 106, a drive line controller 107, a drive line system 108, a body line controller 109, a body line system 110, a storage unit 111, and an automatic operation controller 112. The input unit 101, the data acquisition unit 102, the communication unit 103, the output controller 105, the drive line controller 107, the body line controller 109, the storage unit 111, and the automatic operation controller 112, are connected to one another through a communication network 121. For example, the communication network 121 includes an on-vehicle communication network, a bus, or the like compliant with an arbitrary standard such as controller area network (CAN), local interconnect network (LIN), local area network (LAN), and FlexRay (registered trademark). Note that units of the vehicle control system 100 may be directly connected without using the communication network 121.

Note that hereinafter, in a case where each unit of the vehicle control system 100 communicates through the communication network 121, the description of the communication network 121 is omitted. For example, in a case where the input unit 101 and the automatic operation controller 112 communicate through the communication network 121, it is simply described that the input unit 101 and the automatic operation controller 112 communicate.

The input unit 101 includes devices used by an occupant to input various data, instructions, and the like. For example, the input unit 101 includes an operation device such as a touch panel, a button, a microphone, a switch, and a lever, and an operation device or the like that enables input by a method other than manual operation such as voice or gesture. Additionally, for example, the input unit 101 may be a remote controller that uses infrared rays or other radio waves, or an externally connected device such as a mobile device or a wearable device that corresponds to the operation of the vehicle control system 100. The input unit 101 generates an input signal on the basis of data and instructions input by an occupant, for example, and supplies the input signal to units of the vehicle control system 100.

The data acquisition unit 102 includes various sensors that acquire data used for processing of the vehicle control system 100, and supplies the acquired data to units of the vehicle control system 100.

For example, the data acquisition unit 102 includes various sensors for detecting the state and the like of the vehicle 10. Specifically, for example, the data acquisition unit 102 includes a gyro sensor, an acceleration sensor, an inertial measurement unit (IMU), and a sensor or the like for detecting an accelerator pedal operation amount, a brake pedal operation amount, a steering wheel steering angle, the number of revolutions of the engine, the number of revolutions of the motor, the rotation speed of the wheels, or the like.

Additionally, for example, the data acquisition unit 102 includes various sensors for detecting information on the outside of the vehicle 10. Specifically, for example, the data acquisition unit 102 includes an imaging device such as a time of flight (ToF) camera, a stereo camera, a monocular camera, an infrared camera, and other cameras. Additionally, for example, the data acquisition unit 102 includes an environment sensor for detecting weather and the like, and an ambient information detection sensor for detecting objects around the vehicle 10. The environment sensor includes, for example, a raindrop sensor, a fog sensor, a sunshine sensor, a snow sensor, and the like. The ambient information detection sensor includes, for example, an ultrasonic sensor, radar, light detection and ranging, laser imaging detection and ranging (LiDAR), sonar, and the like.

Further, for example, the data acquisition unit 102 includes various sensors for detecting the current location of the vehicle 10. Specifically, for example, the data acquisition unit 102 includes a global navigation satellite system (GNSS) receiver or the like that receives GNSS signals from a GNSS satellite.

Additionally, for example, the data acquisition unit 102 includes various sensors for detecting information on the inside of the vehicle. Specifically, for example, the data acquisition unit 102 includes an imaging device that captures images of a driver, a biometric sensor that detects biometric information of the driver, and a microphone or the like that collects sound in the vehicle interior. For example, the biometric sensor is provided on a seat surface, a steering wheel, or the like, and detects biometric information of an occupant sitting in the seat or a driver who grips the steering wheel.

The communication unit 103 communicates with the in-vehicle device 104 and various devices outside the vehicle, a server, a base station, and the like, transmits data supplied from units of the vehicle control system 100, and supplies the received data to units of the vehicle control system 100. Note that the communication protocol supported by the communication unit 103 is not particularly limited, and the communication unit 103 can support multiple types of communication protocols.

For example, the communication unit 103 performs wireless communication with the in-vehicle device 104 by wireless LAN, Bluetooth (registered trademark), near field communication (NFC), wireless USB (WUSB), or the like. Additionally, for example, the communication unit 103 performs wired communication with the in-vehicle device 104 by universal serial bus (USB), high-definition multimedia interface (HDMI) (registered trademark), mobile high-definition link (MHL), or the like through a connection terminal (and, if necessary, a cable) not shown.

Moreover, for example, the communication unit 103 communicates with a device (e.g., application server or control server) existing in an external network (e.g., Internet, cloud network, or network unique to business operator) through a base station or an access point. Additionally, for example, the communication unit 103 communicates with a terminal (e.g., terminal of pedestrian or store, or machine type communication (MTC) terminal) existing in the vicinity of the vehicle 10 by using the peer to peer (P2P) technology. Moreover, for example, the communication unit 103 performs V2X communication such as vehicle-to-vehicle (vehicle to vehicle) communication, road-to-vehicle (vehicle to infrastructure) communication, communication between the vehicle 10 and the home (vehicle to home), and pedestrian-to-vehicle (vehicle to pedestrian) communication. Additionally, for example, the communication unit 103 includes a beacon receiving unit, receives radio waves or electromagnetic waves transmitted from a radio station or the like installed on the road, and acquires information such as current location, traffic congestion, traffic restrictions, or required time.

The in-vehicle device 104 includes, for example, a mobile device or a wearable device possessed by a passenger, an information device carried into or attached to the vehicle 10, a navigation device for performing a route search to an arbitrary destination, and the like.

The output controller 105 controls the output of various kinds of information to an occupant of the vehicle 10 or to the outside of the vehicle. For example, the output controller 105 generates an output signal including at least one of visual information (e.g., image data) or auditory information (e.g., voice data), and supplies the output signal to the output unit 106 to control output of visual information and auditory information from the output unit 106. Specifically, for example, the output controller 105 synthesizes image data captured by different imaging devices of the data acquisition unit 102 to generate a bird's-eye image, a panoramic image, or the like, and supplies an output signal including the generated image to the output unit 106. Additionally, for example, the output controller 105 generates voice data including a warning sound, a warning message, or the like for danger such as collision, contact, entry into a dangerous zone, or the like, and supplies an output signal including the generated voice data to the output unit 106.

The output unit 106 includes a device capable of outputting visual information or auditory information to an occupant of the vehicle 10 or to the outside of the vehicle. For example, the output unit 106 includes a display device, an instrument panel, an audio speaker, headphones, a wearable device such as a glasses-type display worn by a passenger, a projector, a lamp, and the like. The display device included in the output unit 106 may be, in addition to a device having a normal display, for example, a device that displays visual information in the visual field of the driver, such as a head-up display, a transmissive display, or a device having an augmented reality (AR) display function.

The drive line controller 107 controls the drive line system 108 by generating various control signals and supplying them to the drive line system 108. Additionally, the drive line controller 107 supplies a control signal to units other than the drive line system 108 as necessary to notify the units of the control state and the like of the drive line system 108.

The drive line system 108 includes various devices related to the drive line of the vehicle 10. For example, the drive line system 108 includes a drive force generation device for generating a drive force of an internal combustion engine, a drive motor, or the like, a drive force transmission mechanism for transmitting the drive force to the wheels, a steering mechanism that adjusts the steering angle, a braking device that generates a braking force, an antilock brake system (ABS), electronic stability control (ESC), an electric power steering device, and the like.

The body line controller 109 controls the body line system 110 by generating various control signals and supplying them to the body line system 110. Additionally, the body line controller 109 supplies a control signal to units other than the body line system 110 as necessary to notify the units of the control state and the like of the body line system 110.

The body line system 110 includes various body-line devices mounted on the vehicle body. For example, the body line system 110 includes a keyless entry system, a smart key system, a power window device, power seats, a steering wheel, an air conditioner, various lamps (e.g., headlights, backlights, brake lights, blinkers, fog lights, and the like), and the like.

The storage unit 111 includes, for example, a magnetic storage device such as a read only memory (ROM), a random access memory (RAM), a hard disc drive (HDD), a semiconductor storage device, an optical storage device, a magneto-optical storage device, and the like. The storage unit 111 stores various programs, data, and the like used by units of the vehicle control system 100. For example, the storage unit 111 stores map data such as a three-dimensional high-precision map like a dynamic map, a global map having a lower precision than the high-precision map and covering a wide area, and a local map or the like including information around the vehicle 10.

The automatic operation controller 112 controls automatic operation such as autonomous traveling or driving assistance. Specifically, for example, the automatic operation controller 112 can perform coordinated control aimed to achieve functions of an advanced driver assistance system (ADAS) including collision avoidance or shock mitigation of the vehicle 10, follow-up traveling based on an inter-vehicle distance, vehicle speed maintenance traveling, warning for collision of the vehicle 10, warning for lane departure of the vehicle 10, or the like. Additionally, for example, the automatic operation controller 112 performs cooperative control aimed for automatic operation of traveling autonomously without depending on the driver's operation, and the like. The automatic operation controller 112 includes a detection unit 131, a self-localization unit 132, a situation analysis unit 133, a planning unit 134, and a motion controller 135.

The detection unit 131 detects various kinds of information necessary for controlling automatic operation. The detection unit 131 includes an outside information detection unit 141, an inside information detection unit 142, and a vehicle state detection unit 143.

The outside information detection unit 141 performs detection processing of information on the outside of the vehicle 10 on the basis of data or signals from units of the vehicle control system 100. For example, the outside information detection unit 141 performs detection processing, recognition processing, and tracking processing of an object around the vehicle 10, and detection processing of a distance to the object. For example, objects to be detected include vehicles, people, obstacles, structures, roads, traffic lights, traffic signs, road markings, and the like. Additionally, for example, the outside information detection unit 141 performs detection processing of the surrounding environment of the vehicle 10. For example, the surrounding environment to be detected includes weather, temperature, humidity, brightness, road surface condition, and the like. The outside information detection unit 141 supplies data indicating the result of the detection processing to the self-localization unit 132, a map analysis unit 151, a traffic rule recognition unit 152, and a situation recognition unit 153 of the situation analysis unit 133, an emergency avoidance unit 171 of the motion controller 135, and the like.

The inside information detection unit 142 performs inside information detection processing on the basis of data or signals from units of the vehicle control system 100. For example, the inside information detection unit 142 performs authentication processing and recognition processing of a driver, driver state detection processing, passenger detection processing, an in-vehicle environment detection processing, and the like. For example, the driver's state to be detected includes physical condition, arousal level, concentration level, fatigue level, line-of-sight direction, and the like. For example, the in-vehicle environment to be detected includes temperature, humidity, brightness, smell, and the like. The inside information detection unit 142 supplies data indicating the result of the detection processing to the situation recognition unit 153 of the situation analysis unit 133, the emergency avoidance unit 171 of the motion controller 135, and the like.

The vehicle state detection unit 143 performs detection processing of the state of the vehicle 10 on the basis of data or signals from units of the vehicle control system 100. For example, the state of the vehicle 10 to be detected includes speed, acceleration, steering angle, presence/absence and content of abnormality, state of driving operation, position and inclination of power seat, state of door lock, state of other in-vehicle devices, and the like. The vehicle state detection unit 143 supplies data indicating the result of the detection processing to the situation recognition unit 153 of the situation analysis unit 133, the emergency avoidance unit 171 of the motion controller 135, and the like.

The self-localization unit 132 performs estimation processing of the location, posture, and the like of the vehicle 10 on the basis of data or signals from units of the vehicle control system 100 such as the outside information detection unit 141 and the situation recognition unit 153 of the situation analysis unit 133. Additionally, the self-localization unit 132 generates a local map (hereinafter referred to as self-localization map) used for estimating the self-location, if necessary. The self-localization map is, for example, a highly accurate map using a technique such as simultaneous localization and mapping (SLAM). The self-localization unit 132 supplies data indicating the result of the estimation processing to the map analysis unit 151, the traffic rule recognition unit 152, the situation recognition unit 153, and the like of the situation analysis unit 133. Additionally, the self-localization unit 132 causes the storage unit 111 to store the self-localization map.

The situation analysis unit 133 performs analysis processing of the vehicle 10 and the surrounding situation. The situation analysis unit 133 includes the map analysis unit 151, the traffic rule recognition unit 152, the situation recognition unit 153, and a situation prediction unit 154.

The map analysis unit 151 uses various data or signals from units of the vehicle control system 100 such as the self-localization unit 132 and the outside information detection unit 141 as necessary to perform analysis processing of various maps stored in the storage unit 111, and constructs a map including information necessary for automatic operation processing. The map analysis unit 151 supplies the constructed map to, for example, the traffic rule recognition unit 152, the situation recognition unit 153, the situation prediction unit 154, and a route planning unit 161, a behavior planning unit 162, and a motion planning unit 163 of the planning unit 134.

The traffic rule recognition unit 152 performs recognition processing of traffic rules around the vehicle 10 on the basis of data or signals from units of the vehicle control system 100 such as the self-localization unit 132, the outside information detection unit 141, and the map analysis unit 151. With this recognition processing, the location and state of signals around the vehicle 10, the content of traffic regulations around the vehicle 10, the lane in which the vehicle can travel, and the like are recognized, for example. The traffic rule recognition unit 152 supplies data indicating the result of the recognition processing to the situation prediction unit 154 and the like.

The situation recognition unit 153 performs recognition processing of the situation regarding the vehicle 10 on the basis of data or signals from units of the vehicle control system 100 such as the self-localization unit 132, the outside information detection unit 141, the inside information detection unit 142, the vehicle state detection unit 143, and the map analysis unit 151. For example, the situation recognition unit 153 performs recognition processing of the situation of the vehicle 10, the situation around the vehicle 10, the situation of the driver of the vehicle 10, and the like. Additionally, the situation recognition unit 153 generates, if necessary, a local map (hereinafter referred to as situation recognition map) used for recognizing the situation around the vehicle 10. The situation recognition map is an occupancy grid map, for example.

For example, the situation of the vehicle 10 to be recognized includes the position, posture, motion (e.g., speed, acceleration, moving direction, and the like) of the vehicle 10, and the presence/absence, content, and the like of abnormality. For example, the situation around the vehicle 10 to be recognized includes the type and location of surrounding stationary objects, the type, location, and motion (e.g., speed, acceleration, moving direction, and the like) of surrounding moving objects, the configuration and condition of road surface of surrounding roads, the ambient weather, temperature, humidity, and brightness, and the like. For example, the driver's state to be recognized includes, physical condition, arousal level, concentration level, fatigue level, line-of-sight movement, driving operation, and the like.

The situation recognition unit 153 supplies data indicating the result of the recognition processing (including situation recognition map if necessary) to the self-localization unit 132, the situation prediction unit 154, and the like. Additionally, the situation recognition unit 153 stores the situation recognition map in the storage unit 111.

The situation prediction unit 154 performs prediction processing of the situation regarding the vehicle 10 on the basis of data or signals from units of the vehicle control system 100 such as the map analysis unit 151, the traffic rule recognition unit 152, and the situation recognition unit 153. For example, the situation prediction unit 154 performs prediction processing of the situation of the vehicle 10, the situation around the vehicle 10, the situation of the driver, and the like.

For example, the situation of the vehicle 10 to be predicted includes behavior of the vehicle 10, occurrence of an abnormality, possible travel distance, and the like. For example, the situation around the vehicle 10 to be predicted includes behavior of a moving object around the vehicle 10, change in signal state, change in environment such as weather, and the like. For example, the driver's situation to be predicted includes driver's behavior, physical condition, and the like.

The situation prediction unit 154 supplies data indicating the result of the prediction processing, together with the data from the traffic rule recognition unit 152 and the situation recognition unit 153, to units such as the route planning unit 161, the behavior planning unit 162, and the motion planning unit 163 of the planning unit 134.

The route planning unit 161 plans a route to a destination on the basis of data or signals from units of the vehicle control system 100 such as the map analysis unit 151 and the situation prediction unit 154. For example, the route planning unit 161 sets a route from the current location to a designated destination on the basis of the global map. Additionally, for example, the route planning unit 161 appropriately changes the route on the basis of traffic jams, accidents, traffic regulations, situations such as constructions, the physical condition of the driver, and the like. The route planning unit 161 supplies data indicating the planned route to the behavior planning unit 162 and the like.

The behavior planning unit 162 plans the behavior of the vehicle 10 for safely traveling the route planned by the route planning unit 161 within a planned time, on the basis of data or signals from units of the vehicle control system 100 such as the map analysis unit 151 and the situation prediction unit 154. For example, the behavior planning unit 162 makes plans for starting, stopping, traveling direction (e.g., forward, backward, left turn, right turn, direction change, and the like), traveling lane, traveling speed, passing, and the like. The behavior planning unit 162 supplies data indicating the planned behavior of the vehicle 10 to the motion planning unit 163 and the like.

The motion planning unit 163 plans the motion the vehicle 10 to achieve the behavior planned by the behavior planning unit 162 on the basis of data or signals from units of the vehicle control system 100 such as the map analysis unit 151 and the situation prediction unit 154. For example, the motion planning unit 163 makes plans for acceleration, deceleration, traveling course, and the like. The motion planning unit 163 supplies data indicating the planned motion of the vehicle 10 to an acceleration/deceleration controller 172 and a direction controller 173 of the motion controller 135, and the like.

The motion controller 135 controls the motion of the vehicle 10. The motion controller 135 includes an emergency avoidance unit 171, an acceleration/deceleration controller 172, and a direction controller 173.

The emergency avoidance unit 171 performs detection processing of emergencies such as collision, contact, entry into dangerous area, abnormality of driver, and abnormality of the vehicle 10 on the basis of detection results of the outside information detection unit 141, the inside information detection unit 142, and the vehicle state detection unit 143. In a case where the occurrence of an emergency is detected, the emergency avoidance unit 171 plans the motion of the vehicle 10 for avoiding an emergency such as a sudden stop or a sharp turn. The emergency avoidance unit 171 supplies data indicating the planned motion of the vehicle 10 to the acceleration/deceleration controller 172, the direction controller 173, and the like.

The acceleration/deceleration controller 172 performs acceleration/deceleration control for achieving the motion of the vehicle 10 planned by the motion planning unit 163 or the emergency avoidance unit 171. For example, the acceleration/deceleration controller 172 calculates a control target value of a driving force generating device or a braking device for achieving planned acceleration, deceleration, or sudden stop, and supplies a control command indicating the calculated control target value to the drive line controller 107.

The direction controller 173 performs direction control for achieving the motion of the vehicle 10 planned by the motion planning unit 163 or the emergency avoidance unit 171. For example, the direction controller 173 calculates a control target value of a steering mechanism for achieving a traveling course or sharp turn planned by the motion planning unit 163 or the emergency avoidance unit 171, and supplies a control command indicating the calculated control target value to the drive line controller 107.

<Configuration of Self-Localization Unit>

Figure 2:
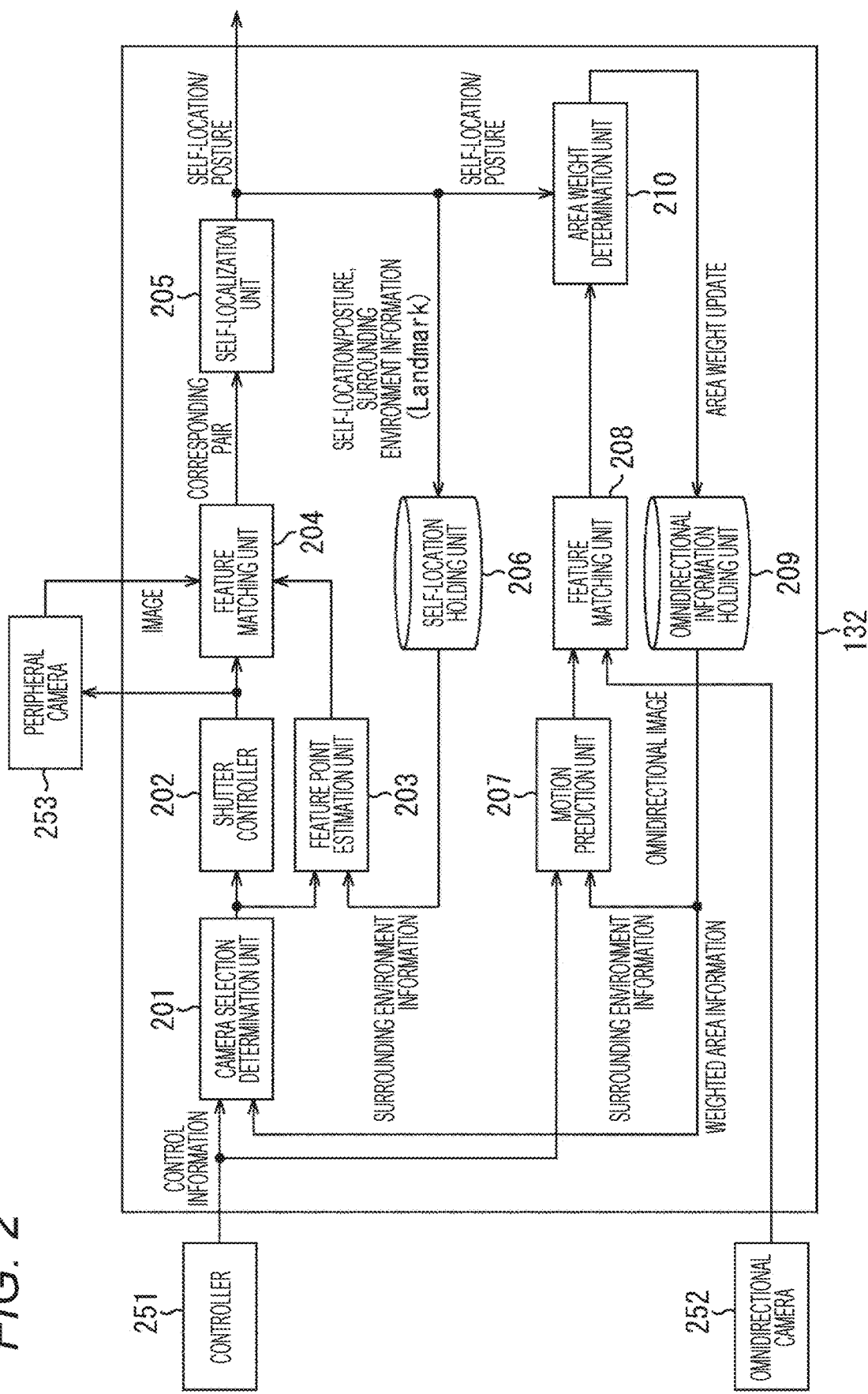
FIG. 2 is a diagram showing a configuration example of a self-localization unit.

FIG. 2 is a diagram showing an internal configuration example of the self-localization unit 132.

The self-localization unit 132 includes a camera selection determination unit 201, a shutter controller 202, a feature point estimation unit 203, a feature matching unit 204, a self-localization unit 205, a self-location holding unit 206, a motion prediction unit 207, a feature matching unit 208, an omnidirectional information holding unit 209, and an area weight determination unit 210.

Control information is supplied from a controller 251 to the self-localization unit 132. Additionally, image data from multiple cameras are also supplied to the self-localization unit 132. An omnidirectional camera 252 and a peripheral camera 253 are mounted on the vehicle as the multiple cameras.

The controller 251 supplies information regarding the speed and moving direction of the vehicle to the self-localization unit 132, and is a part that includes the vehicle state detection unit 143 and the situation recognition unit 153 of FIG. 1, for example.

The omnidirectional camera 252 and the peripheral camera 253 are cameras that image the surroundings of the vehicle, and are a part that includes the data acquisition unit 102 and the outside information detection unit 141 of FIG. 1.

Figure 3:
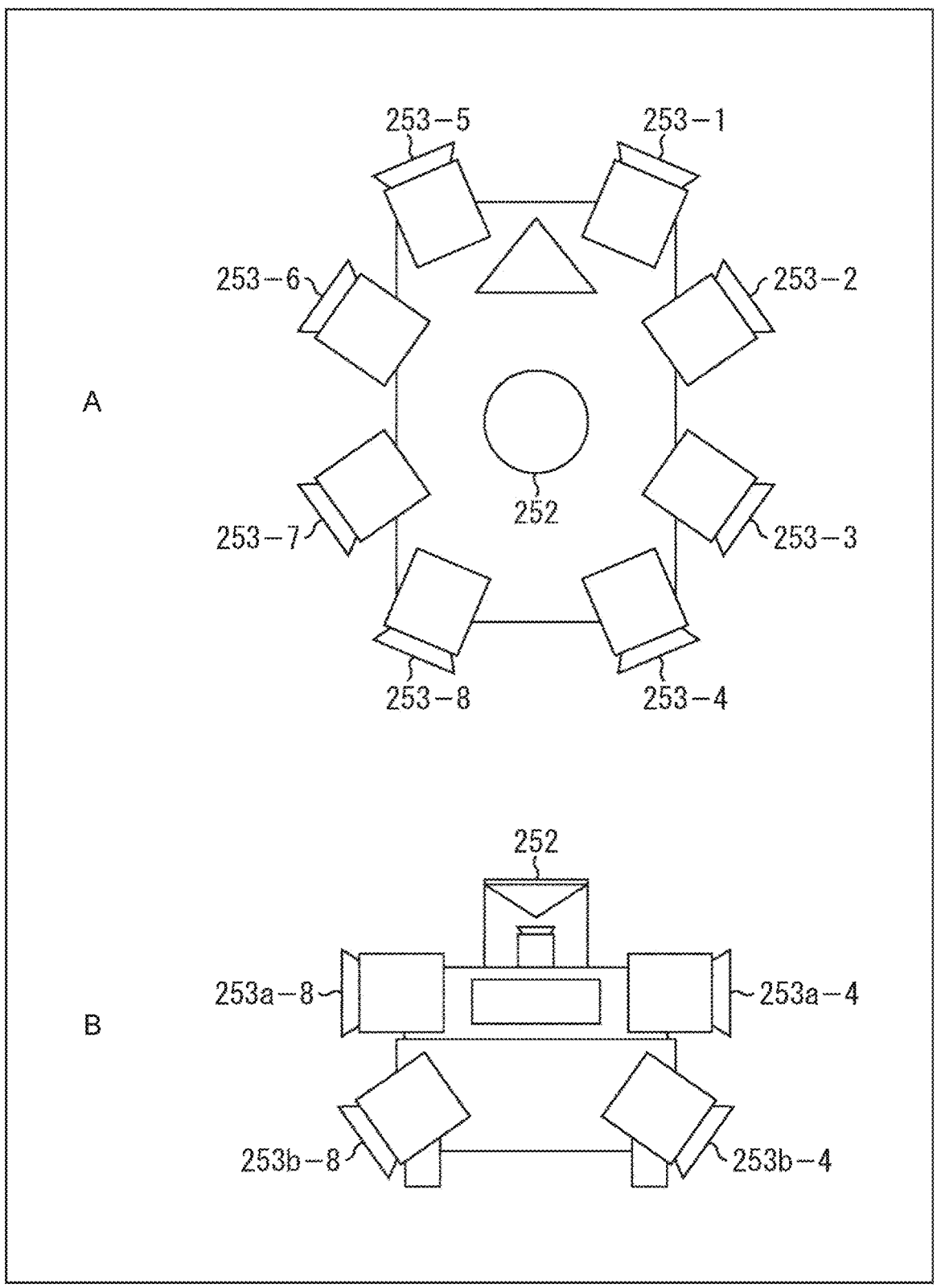
FIG. 3 is a diagram for describing the arrangement of cameras.

FIG. 3 is a diagram showing an example of arrangement positions of the omnidirectional camera 252 and the peripheral camera 253 mounted on the vehicle. A of FIG. 3 is a diagram schematically showing positions where the cameras are arranged when the vehicle is viewed from above, and B of FIG. 3 is a diagram schematically showing positions where the cameras are arranged when the vehicle is viewed from the rear. Note that the arrangement positions described below are examples and are not intended to be limiting.

As shown in A of FIG. 3, the omnidirectional camera 252 is mounted near the center of the vehicle. The omnidirectional camera 252 only needs to be installed at a position where it can image a 360-degree peripheral area around the vehicle.

The area of the surrounding environment imaged by the omnidirectional camera 252 is an area of 360 degrees in a plane parallel to the ground (horizontal direction), and is an area whose distance from the vehicle is within a predetermined range. On the other hand, while the area of the surrounding environment imaged by the omnidirectional camera 252 in a plane orthogonal to the ground (vertical direction) may be 360 degrees, the area may be within the range of an angle, such as about 270 degrees, at which a predetermined range in the sky direction is not imaged.

The omnidirectional camera 252 may be capable of imaging a 360 degree range with a single imaging device, or may be capable of imaging a 360 degree range with multiple imaging devices.

As shown in A of FIG. 3, multiple peripheral cameras 253 are mounted so that the surroundings of the vehicle can be imaged. In the example shown in A of FIG. 3, eight peripheral cameras 253-1 to 253-8 are mounted.

The peripheral camera 253-1 is arranged at the front right of the vehicle, the peripheral camera 253-2 is arranged at the diagonally frontward right of the vehicle, the peripheral camera 253-3 is arranged at the diagonally rearward right of the vehicle, and the peripheral camera 253-4 is arranged at the rear right of the vehicle. The peripheral camera 253-5 is arranged at the front left of the vehicle, the peripheral camera 253-6 is arranged at the diagonally frontward left of the vehicle, the peripheral camera 253-7 is arranged at the diagonally rearward left of the vehicle, and the peripheral camera 253-8 is arranged at the rear left of the vehicle.

As shown in B of FIG. 3, the peripheral camera 253 includes a peripheral camera 253*a*-8 mounted in the horizontal direction and a peripheral camera 253*b*-8 mounted to face downward. Since B in FIG. 3 is a diagram of the vehicle as viewed from the rear, the peripheral camera 253-8 arranged at the rear of the vehicle can be seen.

In the following description, the peripheral camera 253 mounted in the horizontal direction is referred to as a horizontal camera 253*a*, and the peripheral camera 253 mounted in the downward direction is referred to as a downward camera 253*b*. Additionally, in a case where it is not necessary to individually distinguish the horizontal camera 253*a* and the downward camera 253*b*, or in a case where it is desired to indicate a combination of the horizontal camera 253*a* and the downward camera 253*b*, the horizontal camera 253*a* and the downward camera 253*b* are simply referred to as peripheral camera 253.

In the example shown in FIG. 3, the vehicle is equipped with eight horizontal cameras 253*a*-1 to 253*a*-8 and eight downward cameras 253*b*-1 to 253*b*-8. The set of the horizontal camera 253*a*-1 and the downward camera 253*b*-1 is included in the peripheral camera 253-1, the set of the horizontal camera 253*a*-2 and the downward camera 253*b*-2 is included in the peripheral camera 253-2, the set of the horizontal camera 253*a*-3 and the downward camera 253*b*-3 is included in the peripheral camera 253-3, and the set of the horizontal camera 253*a*-4 and the downward camera 253*b*-4 is included in the peripheral camera 253-4.

Additionally, the set of the horizontal camera 253*a*-5 and the downward camera 253*b*-5 is included in the peripheral camera 253-5, the set of the horizontal camera 253*a*-6 and the downward camera 253*b*-6 is included in the peripheral camera 253-6, the set of the horizontal camera 253*a*-7 and the downward camera 253*b*-7 is included in the peripheral camera 253-7, and the set of the horizontal camera 253*a*-8 and the downward camera 253*b*-8 is included in the peripheral camera 253-8.

In this way, the vehicle is equipped with the omnidirectional camera 252 that acquires a 360-degree peripheral image around the vehicle, and the multiple peripheral cameras 253 that image a predetermined area around the vehicle.

Note that while the description herein will be continued by exemplifying a combination of eight sets (16 units) of peripheral cameras 253 and a single omnidirectional camera 252, the number of peripheral cameras 253 is not limited to 16, and other numbers of peripheral cameras 253 may be used. Additionally, multiple omnidirectional cameras 252 may be installed instead of a single omnidirectional camera 252.

The description returns to the internal configuration example of the self-localization unit 132 of FIG. 2. The camera selection determination unit 201 is supplied with control information from the controller 251, and is supplied with weighted area information from the omnidirectional information holding unit 209. Control information is information regarding the traveling direction, speed, and the like of the vehicle, for example. While weighted area information will be described in detail later, in a case where eight sets of peripheral cameras 253 are mounted as shown in FIG. 3, weighted area information is information regarding weighting for areas imaged by the eight sets of peripheral cameras 253.

The camera selection determination unit 201 uses the control information and the weighted area information to select the peripheral camera 253 to be used from the 16 peripheral cameras 253. Note that the peripheral camera 253 to be used means that the peripheral camera 253 selected to be used is turned on, and the peripheral cameras 253 other than the peripheral camera 253 selected to be used are turned off.

The selection determination result by the camera selection determination unit 201 is supplied to the shutter controller 202 and the feature point estimation unit 203. The shutter controller 202 controls imaging processing of the peripheral camera 253 selected by the camera selection determination unit 201.

The feature matching unit 204 is supplied with the image captured by the peripheral camera 253, information on the peripheral camera 253 whose imaging processing is controlled by the shutter controller 202, and the estimation result from the feature point estimation unit 203. The feature matching unit 204 extracts a feature point from the image, searches a feature point extracted from an image of a previous frame that coincides with the feature point, generates a corresponding pair of feature points, and supplies the corresponding pair of feature points to the self-localization unit 205.

Note that while the description herein is continued assuming that feature points are extracted, areas may be extracted instead of points. For example, an edge portion may be extracted from an image, and an area including the edge may be extracted as an area with a feature to be used in the subsequent processing. Additionally, in processing described later, processing of sorting areas is performed according to the number of feature points in a predetermined area. In this processing, too, in a case of using area, processing of sorting is performed according to the size of the area extracted as an area with a feature.

Additionally, while the description herein will be continued by exemplifying the case where the feature point extracted from the image one frame earlier and the feature point extracted from the image of the current frame are compared, the present technology is also applicable to a case where the current frame is compared not with one frame earlier but with several frames earlier. Additionally, the timing at which the frame (image) is acquired may certainly be a general timing such as a timing of 30 frames per second, for example, but may be other timings.

The self-localization unit 205 estimates the location of the vehicle using the corresponding pair of feature points. The estimation result from the self-localization unit 205 includes the location of the vehicle, the posture of the vehicle, information on the surrounding environment (landmark information), and the like. The information on the self-location and the self-posture is output to the outside of the self-localization unit 132 such as to the map analysis unit 151 or the situation recognition unit 153 (FIG. 1). Additionally, the information such as self-location, self-posture, and the surrounding environment is also supplied to and held in the self-location holding unit 206.

The self-location holding unit 206 holds information regarding self-location, self-posture, the surrounding environment, and the like for at least a single frame. These pieces of information are necessary for creating an environment map. An environment map is information obtained by a method, such as simultaneous localization and mapping (SLAM), in which self-localization is performed on the basis of the correspondence between feature points detected from a captured image and landmarks registered in advance and registered in sequence on three-dimensional coordinates corresponding to real space.

Here, a landmark is a part of the object in real space for which a feature point is detected from a captured image or for which a feature point can be detected from a captured image. At the time of self-localization, a three-dimensional map showing information indicating the position of each landmark, that is, position information of the landmark in the three-dimensional coordinate system is used.

Specifically, for example, by the processing in the feature matching unit 204, the correspondence between feature points detected from images captured at different imaging times is obtained, and the self-location of the vehicle is estimated from the correspondence between the feature points, the correspondence between the feature point and the landmark, and the like. Information regarding the estimated self-location is held in the self-location holding unit 206.

Information on the surrounding environment held in the self-location holding unit 206 is supplied to the feature point estimation unit 203. The feature point estimation unit 203 predicts at which position the feature point one frame earlier was captured in the image captured by the peripheral camera 253 selected by the camera selection determination unit 201.

The processing of the feature point estimation unit 203 will be described with reference to FIG. 4. Referring to A of FIG. 4, assume that at time t-1, the peripheral camera 253-6 is selected by the camera selection determination unit 201, the peripheral camera 253-6 performs imaging, and an image 301-1 is captured. From this image 301-1, a feature point 311-1 is detected.

Figure 4:
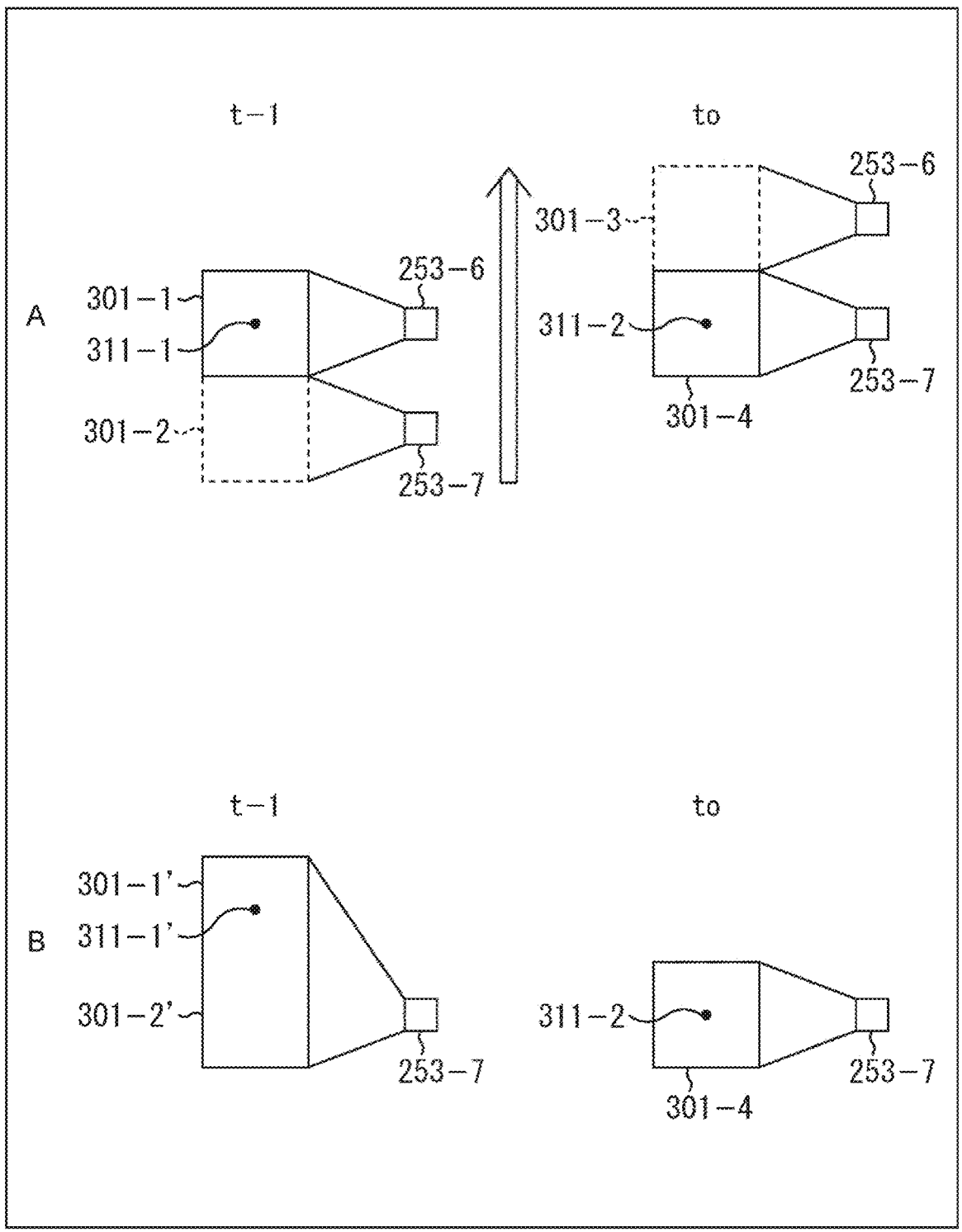
FIG. 4 is a diagram for describing estimation of feature points.

Assume that the vehicle is moving to the front, information in A of FIG. 4. Assume that at time t0, which is one frame after time t-1, the peripheral camera 253-7 is selected by the camera selection determination unit 201, the peripheral camera 253-7 performs imaging, and an image 301-4 is captured. From this image 301-4, a feature point 311-2 is detected. Assume that the feature point 311-1 and the feature point 311-2 are feature points extracted from the same stationary object.

In such a case, for example, if the feature matching unit 204 performs matching between the feature point 311-1 extracted from the image 301-1 captured at time t-1 and the feature point 311-2 extracted from the image 301-4 captured at time t0, incorrect matching will be performed and incorrect self-localization will be performed.

For example, in this case, if the feature point 311-1 is in the center of the image 301-1 and the feature point 311-2 is in the center of the image 301-4, the feature point 311 in the image 301 is not moving. Hence, it may be determined that the vehicle is not moving, as a result of self-localization.

For this reason, as shown in B of FIG. 4, for example, assume that at time t-1, the peripheral camera 253-7 captures an image 301-1' and an image 301-2', and a feature point 311-1' is extracted. Then, matching is performed between the feature point 311-1' and the feature point 311-2 extracted from the image 301-4 captured by the peripheral camera 253-7 at time t0.

The feature point 311-1' corresponds to the feature point 311-1 extracted from the image 301-1. That is, at time t-1, the peripheral camera 253-7 is not performing imaging because it is not selected, but the position where the feature point 311-1 would be if the peripheral camera 253-7 performs imaging is estimated, and the position of the feature point 311-1' is identified. In other words, the positional relationship between the peripheral camera 253-7 and the feature point 311-1 at time t-1 is estimated, and, assuming that the feature point 311-1' is in the estimated position, matching is performed between the feature point 311-1' and the feature point 311-2 extracted from the image 301-4 captured at time t0.

In this way, the feature point estimation unit 203 performs processing of estimating at which position a feature point extracted from an image one frame earlier exists in an image of the current frame, and the estimation result is supplied to the feature matching unit 204. The feature matching unit 204 performs matching in a state as shown in B of FIG. 4.

In this way, information such as feature points extracted from images captured by different peripheral cameras 253 at different times is shared, and processing in which multiple cameras are linked can be performed.

In this case, matching is performed between the feature point 311-1' estimated as the position of the feature point at time t-1 and the feature point 311-2 extracted as the feature point at time t0.

The description returns to the internal configuration example of the self-localization unit 132 of FIG. 2. An image captured by the omnidirectional camera 252 is also supplied to the self-localization unit 132. The image captured by the omnidirectional camera 252 is supplied to the feature matching unit 208. The feature matching unit 208 performs matching between a feature point extracted from the image captured by the omnidirectional camera 252 and the feature point supplied from the motion prediction unit 207.

The processing of the motion prediction unit 207 and the feature matching unit 208 will be described with reference to FIG. 5. The image obtained by the omnidirectional camera 252 is divided into eight pieces. For example, as shown in the upper part of FIG. 5, when a circle is an image 351 obtained by the omnidirectional camera 252, this image 351 is divided into eight areas. The number of divisions of the image 351 is the same as the number (number of sets) of the peripheral cameras 253, in other words, the number of divisions of the image 351 is the same as the number of horizontal cameras 253a. Here, since the number of horizontal cameras 253a is eight, the number of divisions of the image 351 is eight, and the image 351 is divided into eight areas.

The image 351 captured by the omnidirectional camera 252 is divided into the same number of areas as the number of horizontal cameras 253a in this way, to enable selection of the horizontal camera 253a to be used depending on the number of feature points extracted from the area. In the diagram shown in the upper left portion of FIG. 5, an area 351-1 is an area assigned to the horizontal camera 253a-1. If there are many feature points extracted from this area 351-1 and satisfying a predetermined condition, the horizontal camera 253a-1 is selected as the horizontal camera 253a to be used.

Similarly, an area 351-2 is an area assigned to the horizontal camera 253a-2, an area 351-3 is an area assigned to the horizontal camera 253a-3, and an area 351-4 is an area assigned to the horizontal camera 253a-4. Moreover, similarly, an area 351-5 is an area assigned to the horizontal camera 253a-5, an area 351-6 is an area assigned to the horizontal camera 253a-6, an area 351-7 is an area assigned to the horizontal camera 253a-7, and an area 351-8 is an area assigned to horizontal camera 253a-8.

Figure 5:
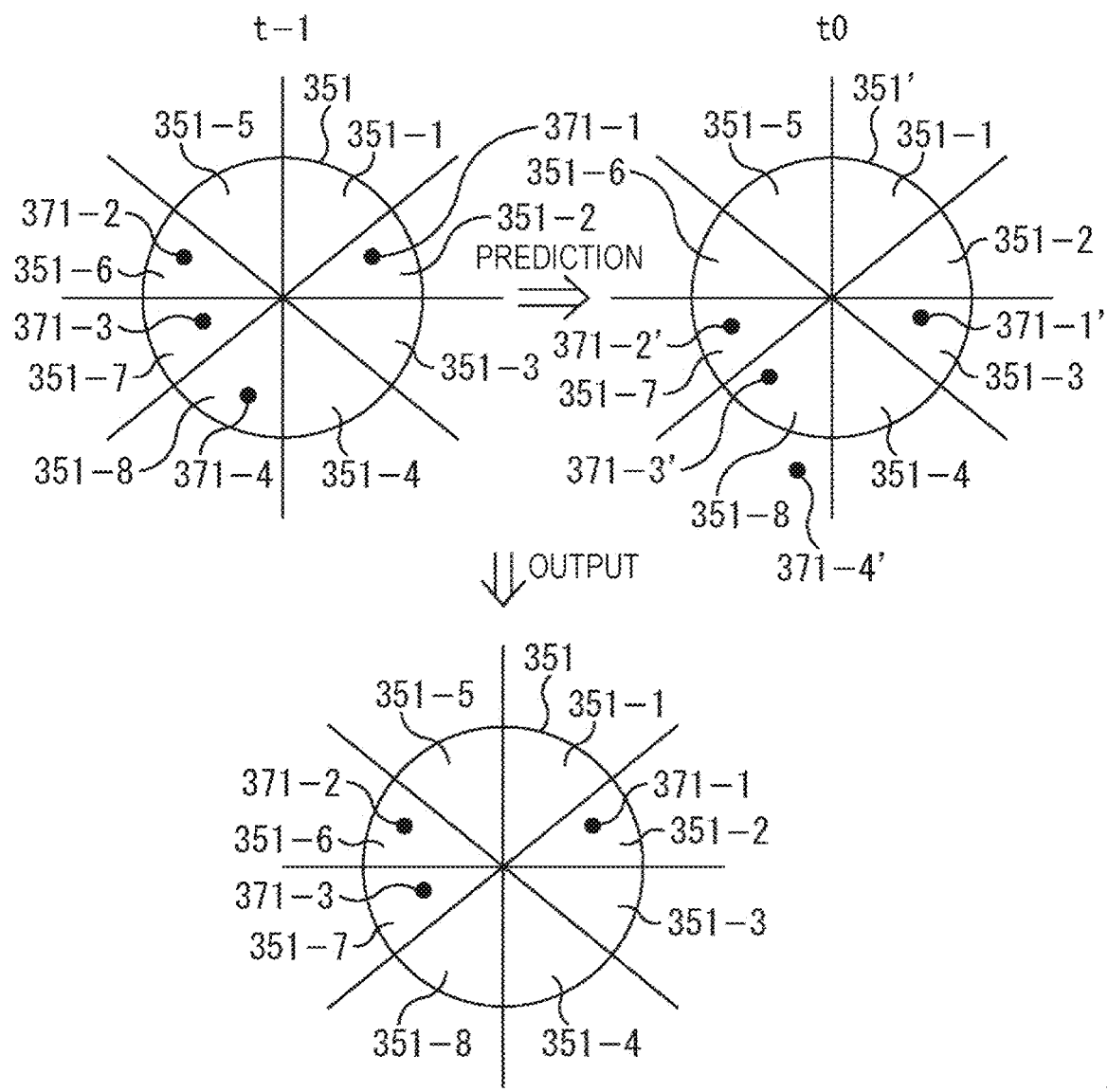
FIG. 5 is a diagram for describing estimation of feature points.

Referring to the diagram shown in the upper left diagram of FIG. 5, it is assumed that four feature points are extracted from the image 351 captured by the omnidirectional camera 252 at time t-1. Here, for the sake of explanation, the number of feature points is set to four, and the description will be continued by citing an example in which a single feature point is extracted a single area.

Assume that a feature point 371-1 is extracted from the area 351-2, a feature point 371-2 is extracted from the area 351-6, a feature point 371-3 is extracted from the area 351-7, and a feature point 371-4 is extracted from the area 351-8. Information on the feature points 371 extracted at time t-1 is held in the omnidirectional information holding unit 209 as surrounding environment information, and is supplied to the motion prediction unit 207 at time t0.

Control information is also supplied from the controller 251 to the motion prediction unit 207. Control information is information regarding the traveling direction of the vehicle, and the description herein will be continued by exemplifying a case where information that the vehicle is traveling straight ahead is input.

The motion prediction unit 207 determines, from the control information, that the traveling direction of the vehicle is the front, and predicts positions to which the feature points 371-1 to 371-4 extracted at time t-1 will have moved at time t0. When the vehicle is moving forward, a stationary object relatively moves backward. Hence, it is predicted that the feature point 371 also moves backward (toward lower side in FIG. 5).

As shown in the upper right diagram of FIG. 5, the feature points 371-1 to 371-4 are estimated to be feature points 371-1' to 371-4' that have moved backward. At the time of this estimation, by considering the moving speed as well, the estimation can be performed with higher accuracy. As a result of the estimation, if the feature point 371-4' is estimated to be located outside an image 351', the motion prediction unit 207 outputs the feature points 371-1 to 371-3 to the feature matching unit 208 as the feature point information at time t-1, as shown in the lower diagram of FIG. 5. That is, in this case, feature point information excluding the feature point 371-4 estimated not to be extracted from the image captured at time t0 is supplied to the feature matching unit 208.

In this way, by narrowing down the number of feature points used for matching by the motion prediction unit 207, the processing amount of the feature matching unit 208 can be reduced. The feature matching unit 208 performs matching between information on the feature point 371 from the motion prediction unit 207 (information obtained from image at time t-1 as shown in upper left diagram of FIG. 6) and information on the feature point from the omnidirectional camera 252 (information obtained from image at time t0 as shown in upper right diagram of FIG. 6).

Figure 6:
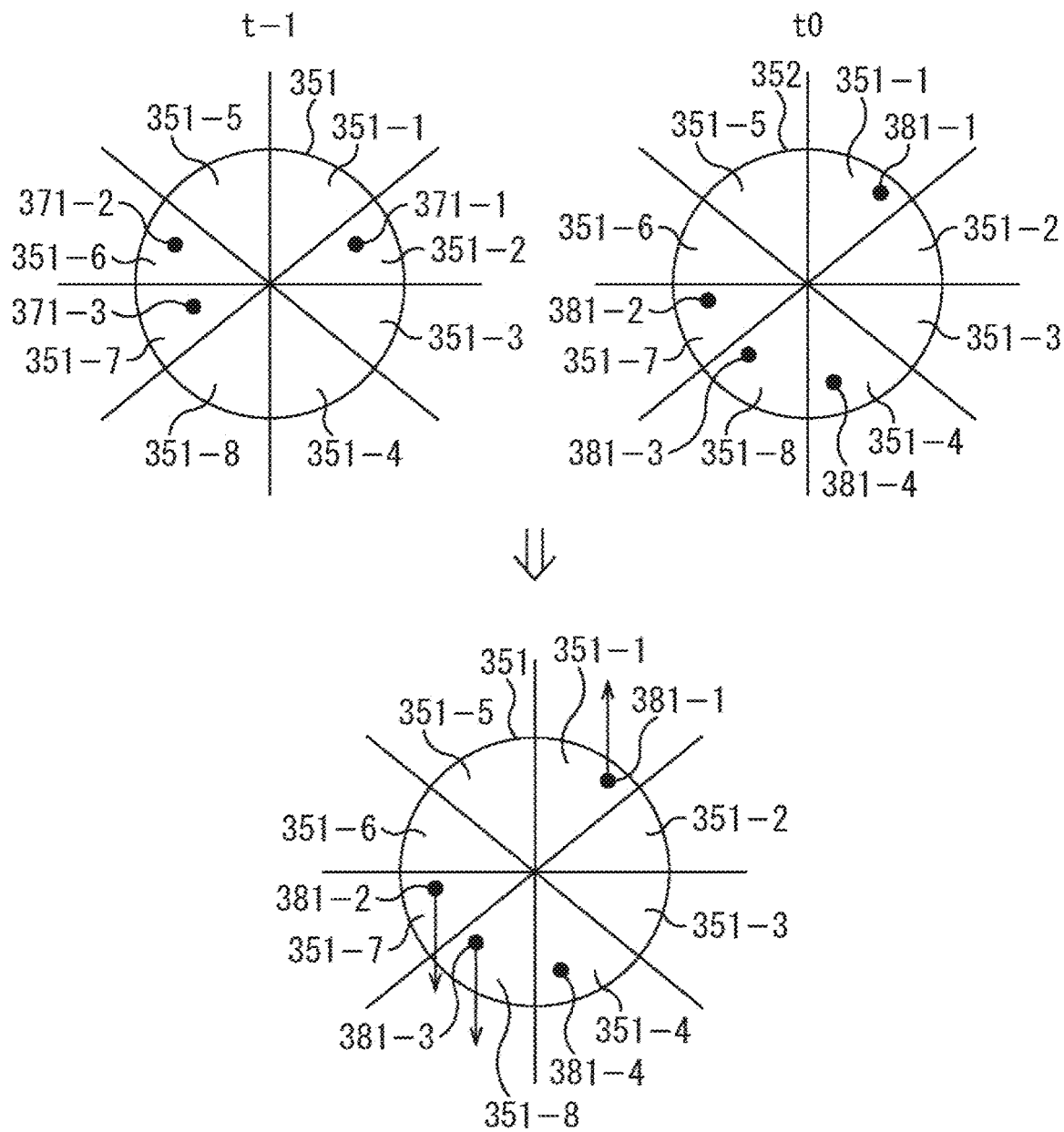
FIG. 6 is a diagram for describing estimation of feature points.

The upper right diagram of FIG. 6 shows feature points 381-1 to 381-4 extracted from an image 352 obtained from the omnidirectional camera 252 at time t0. The feature matching unit 208 determines that the feature point 371-1 extracted from the image 351 obtained from the omnidirectional camera 252 at time t-1 has moved to the feature point 381-1, the feature point 371-2 has moved to the feature point 381-2, and the feature point 371-3 has moved to the feature point 381-3.

At the time of such a determination, information on the position of the feature point estimated from the traveling direction and speed of the vehicle as shown in the upper right diagram of FIG. 5 may be used, and the vicinity of the estimated position of the feature point may be searched to limit the search range. This can reduce processing load for matching of the feature points.

The feature matching unit 204 detects the moving direction of the feature point as a result of the matching of the feature points, and detects the feature point in which the moving direction of the feature point coincides with the moving direction of the vehicle. In the example shown in FIG. 6, as indicated by arrows in the lower diagram, it is determined that the feature point 381-1 is a feature point in which the feature point 371-1 has moved upward, the feature point 381-2 is a feature point in which the feature point 371-2 has moved downward, and the feature point 381-3 is a feature point in which the feature point 371-3 has moved downward. Additionally, it is determined that the feature point 381-4 is a feature point that has not been matched with any feature point extracted from the image 351 captured at time t-1.

The feature matching unit 208 outputs such a matching result to the area weight determination unit 210. The area weight determination unit 210 is supplied with information on self-location and self-posture from the self-localization unit 205, and is supplied with the matching result from the feature matching unit 208.

The area weight determination unit 210 detects feature points in a direction that coincides with the moving direction of the vehicle. For example, in a case where the vehicle is moving forward, a feature point extracted from a stationary object moves backward. Hence, a feature point in a direction that coincides with the moving direction of the vehicle is a feature point determined to have moved backward. Additionally, for example, in a case where the vehicle is moving backward, a feature point extracted from a stationary object moves forward. Hence, a feature point in a direction that coincides with the moving direction of the vehicle is a feature point determined to have moved forward.

In this way, the area weight determination unit 210 detects a feature point that is moving in a moving direction that matches (does not conflict) the moving direction of the vehicle. For example, in a case where the matching result as shown in the lower diagram of FIG. 6 is supplied to the area weight determination unit 210 and it is determined that the moving direction of the vehicle is forward (it is determined that the feature point will move rearward), the feature point 381-2 and the feature point 381-3 are detected as feature points in the direction that matches the moving direction of the vehicle.

Since the feature point 381-1 is not a feature point in a direction that matches the moving direction of the vehicle, the feature point 381-1 is not detected as a feature point in a direction that matches the moving direction of the vehicle. Like the feature point 381-1, a feature point in a direction that does not match the moving direction of the vehicle, in other words, a feature point moving in a moving direction that does not match the moving direction of the vehicle is a feature point extracted from a moving body, for example.

When estimating the self-location, it is necessary to detect change in the positional relationship with a stationary object. Also, in other words, when estimating the self-location, it is necessary to exclude information on moving bodies, such as to exclude feature points extracted from a moving body. According to the present technology, as described above, by extracting feature points in a direction that matches the moving direction of the vehicle, feature points that may have been extracted from a moving body can be excluded.

Additionally, the area weight determination unit 210 detects feature points that match the moving direction of the vehicle, detects the number of detected feature points for each area, and sorts the areas in descending order of the number of feature points. The area where many feature points are detected is an area where information necessary for estimating the self-location, in this case, feature points extracted from a stationary object, is easily extracted.

Accordingly, an area where such feature points are easily extracted is detected, and the peripheral camera 253 corresponding to the detected area is used. Hence, as described above, the area weight determination unit 210 sorts the areas in descending order of the number of feature points. Then, areas are selected until the number of feature points in the sorted area reaches a predetermined number.

For example, in the case of the matching result shown in the lower diagram of FIG. 6, the area 351-7 from which the feature point 381-2 is extracted and the area 351-8 from which the feature point 381-8 is extracted are detected. In FIG. 6, for the sake of explanation, the number of feature points extracted from each of the area 351-7 and the area 357-8 is one. However, assume that 20 feature points are extracted from the area 351-7, and 10 feature points are extracted from the area 351-8, for example.

In this case, if the area 351 is sorted by the number of feature points, the area 351-7 and the area 351-8 are sorted in this order. Then, if the predetermined number is 15, for example, only the area 351-7 is selected since the condition is satisfied when the area 351-7 is selected. Meanwhile, if the predetermined number is 30, for example, since the condition is not yet satisfied when the area 351-7 is selected, the next area 351-8 is selected according to the sorted order. Since the total number of feature points reaches 30 and the condition is satisfied when the area 351-8 is selected, the area 351-7 and the area 351-8 are the selection result.

The area weight determination unit 210 thus selects the area 351, and supplies the information on the selected area 351 to the omnidirectional information holding unit 209. The information output from the area weight determination unit 210 is information on the selected area 351. This information may be the number of feature points extracted from the area 351, or may be a numeric value assigned according to the sorted order, for example.

Additionally, the information may be information such as a flag indicating the location of the selected area 351. For example, in the above example, the information indicates that the area 351-7 and the area 351-8 are flagged.

As described above, the information on the selected area 351 is supplied to and held in the omnidirectional information holding unit 209. The information on the selected area 351 is information indicating an area in which the feature point extracted from the stationary object is easily extracted. Such information is supplied to the camera selection determination unit 201 as weighted area information.

As described above, the camera selection determination unit 201 selects the peripheral camera 253 used for imaging. As will be described in detail with reference to the flowchart shown in FIG. 7, whether to use the horizontal camera 253*a* or the downward camera 253*b* is selected depending on the speed of the vehicle, and in the case of using the horizontal camera 253*a*, the horizontal camera 253*a* to be used is selected on the basis of weighted area information. Specifically, weighted area information is used to determine the selected area 351, and the horizontal camera 253*a* corresponding to the determined area 351 is selected.

In this way, since the peripheral camera 253 is selected, in other words, since the peripheral camera 253 used for imaging and the peripheral camera 253 not used for imaging are selected, the power consumed by the peripheral camera 253 can be reduced, the number of images to be processed can be reduced, and the processing load on image processing (self-localization processing) can be reduced.

Here, as described with reference to FIG. 3, the description is given by exemplifying a case where a total of 16 peripheral cameras 253 including eight horizontal cameras 253*a* and eight downward cameras 253*b* are mounted. Compared to a case where 16 peripheral cameras 253 are always operated, power consumption is lower in a case where eight downward cameras 253*b* are used, for example. Moreover, power consumption is obviously lower in a case where a predetermined number of horizontal cameras 253*a* of the eight horizontal cameras 253*a* are used, for example.

Additionally, if the number of peripheral cameras 253 used is small, only the images obtained from the small number of peripheral cameras 253 need be processed, and the processing load for processing the images can be reduced.

Moreover, as described above and as will be described later, since the peripheral camera 253 to be used is selected according to speed and the number of feature points, power consumption can be reduced and processing load can be reduced without lowering the accuracy of self-localization.

<Processing of Self-Localization Unit>

The operation of the self-localization unit 132 (FIG. 2) will be described with reference to flowcharts shown in FIGS. 7 to 10.

In step S11, the camera selection determination unit 201 determines whether or not the moving speed of the vehicle is equal to or higher than (greater than) a predetermined threshold value. In step S11, if it is determined that the moving speed of the vehicle is equal to or higher than the predetermined threshold value, the processing proceeds to step S12, and if it is determined that the moving speed of the vehicle is not equal to or higher than the predetermined threshold value, the processing proceeds to step S15.

When the processing proceeds to step S12, the horizontal camera 253*a* is set as the peripheral camera 253 used for imaging, and the self-localization processing is performed. On the other hand, when the processing proceeds to step S15, the downward camera 253*b* is set as the peripheral camera 253 used for imaging, and the self-localization processing is performed.

Thus, when the moving speed of the vehicle is equal to or higher than the predetermined threshold value, in other words, when the vehicle is moving at high speed, the horizontal camera 253*a* is used, and when the moving speed of the vehicle is not equal to or higher than the predetermined threshold value, in other words, when the vehicle is moving at low speed, the downward camera 253*b* is used.

Note that while the description herein will be given separately for high speed and low speed, in other words, while the description will be continued by exemplifying a case where there is a single predetermined threshold value, the processing may be performed by providing multiple threshold values. For example, the speed may be divided into high speed (equal to or higher than threshold A), medium speed (lower than threshold A and equal to or higher than threshold B), and low speed (lower than threshold B). The horizontal camera 253*a* may be used at high speed, the horizontal camera 253*a* and the downward camera 253*b* may be used at medium speed, and the downward camera 253*b* may be used at low speed.

If it is determined in step S11 that the moving speed of the vehicle is faster than the threshold speed, the processing proceeds to step S12. In step S12, area selection processing is performed. The area selection processing performed in step S12 will be described with reference to the flowchart in FIG. 8.

Area selection processing is performed by the motion prediction unit 207, the feature matching unit 208, the omnidirectional information holding unit 209, and the area weight determination unit 210, and is performed as described with reference to FIGS. 5 and 6. Hence, overlapping description will be omitted as appropriate.

In step S31, an image from the omnidirectional camera 252 is acquired. In this case, the image from the omnidirectional camera 252 is supplied to the feature matching unit 208. In step S32, the feature matching unit 208 extracts feature points from the supplied image from the omnidirectional camera 252. While such processing is being performed, in step S33, feature points extracted from an image one frame earlier are read from the omnidirectional information holding unit 209.

As described with reference to FIG. 5, the motion prediction unit 207 reads the feature points (surrounding environment information) extracted from the image one frame earlier from the omnidirectional information holding unit 209, determines the traveling direction of the vehicle from control information, predicts the destination of the feature points from the traveling direction of the vehicle, and supplies the prediction result to the feature matching unit 208.

In step S34, as described with reference to FIG. 6, the feature matching unit 208 performs matching between the feature points from the image one frame earlier and the feature points from the image of the current frame. In step S35, the moving direction of each feature point is determined as a result of matching.

In step S36, the feature points in which the moving direction of the vehicle and the moving direction of the feature points match are extracted. In the processing, as described with reference to FIG. 6, feature points that are determined to have a proper moving direction (have no conflict) with respect to the traveling direction of the vehicle are extracted.

In step S37, the area weight determination unit 210 sorts the areas 351 in descending order of the number of feature points in each area 351. Then, in step S38, the areas 351 are selected in the sorted order until the cumulative number of feature points reaches a predetermined number. When such a selection is made, the selection result is supplied to the omnidirectional information holding unit 209, and the area weight information held in the omnidirectional information holding unit 209 is updated.

Figure 7:
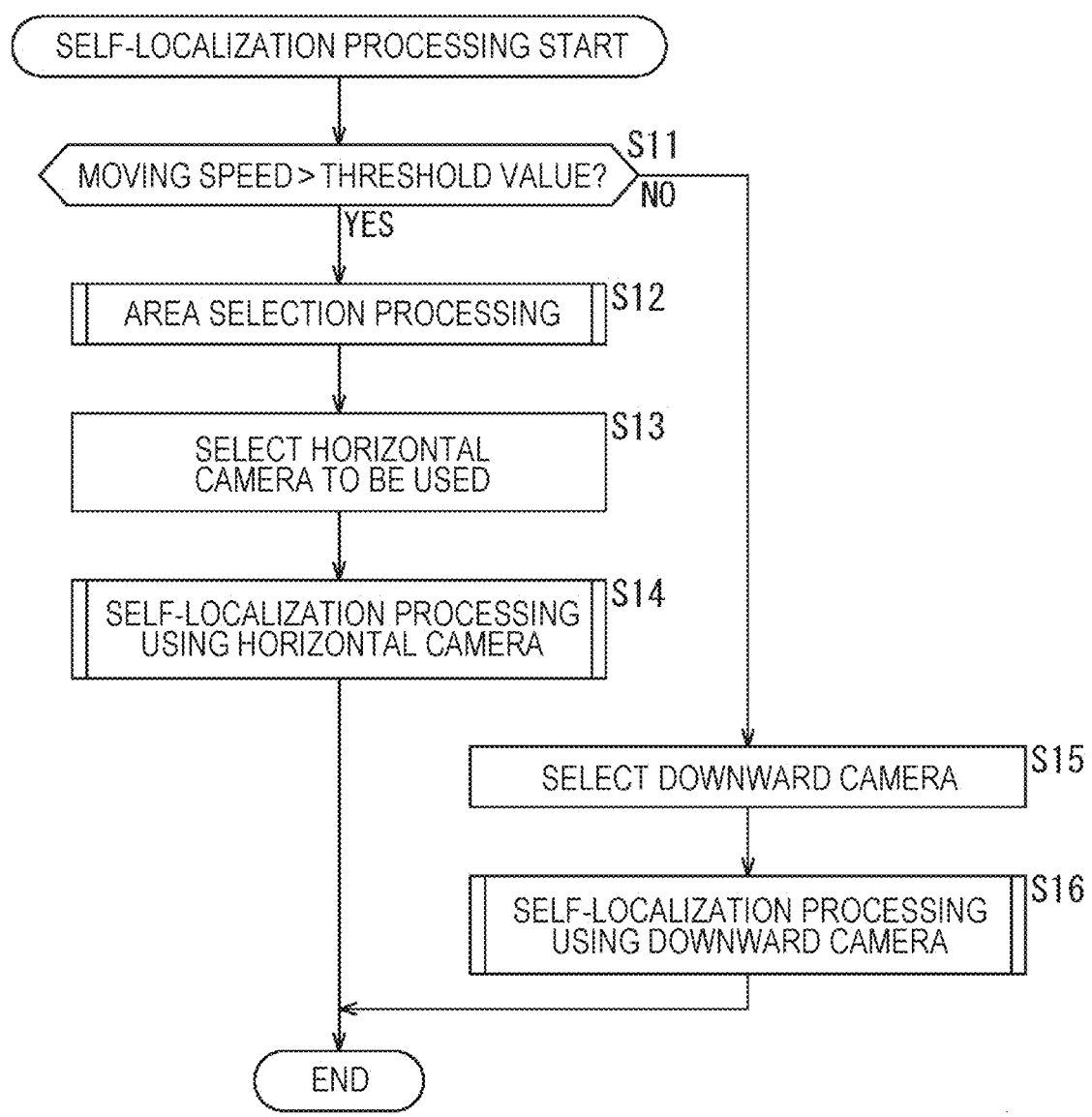
FIG. 7 is a flowchart for describing processing of the self-localization unit.
Figure 8:
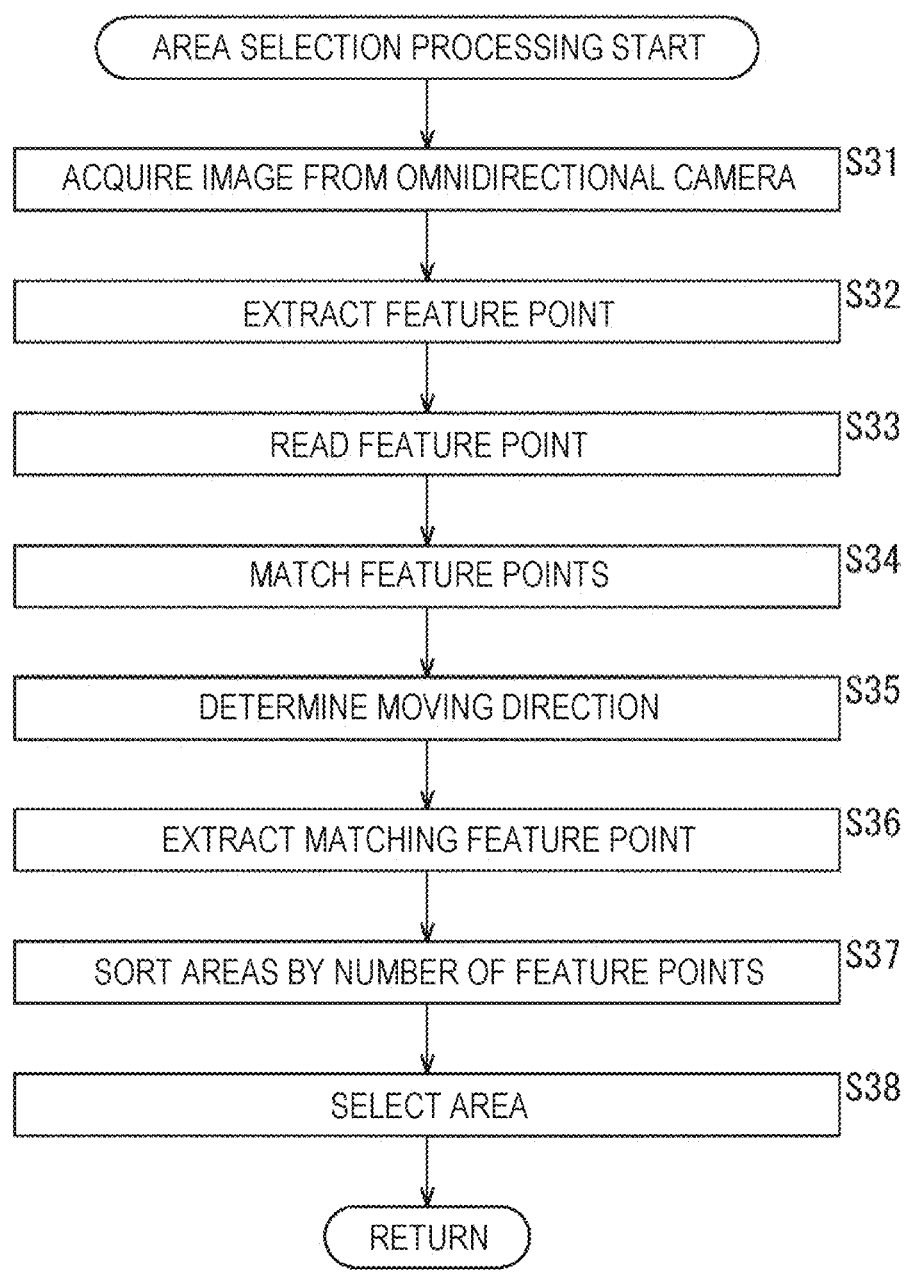
FIG. 8 is a flowchart for describing processing of the self-localization unit.

When the area selection processing is performed in this way, the processing proceeds to step S13 (FIG. 7).

In step S13, the camera selection determination unit 201 selects the horizontal camera 253a to be used. If the camera selection determination unit 201 determines that the moving speed of the vehicle is high, the camera selection determination unit 201 sets the peripheral camera 253 that captures an image used for self-localization to the horizontal camera 253a, and further sets which horizontal camera 253a to use among the eight horizontal cameras 253a from the weighted area information held in the omnidirectional information holding unit 209.

That is, according to the weighted area information, the horizontal camera 253a corresponding to the weighted area 351 is set as the horizontal camera 253a to be used (horizontal camera 253a to be turned on to perform imaging processing).

Weighted area information is information regarding the area 351 selected by the area weight determination unit 210 as an area from which more feature points usable in self-localization can be extracted. Hence, by using the horizontal camera 253a that captures the range of such an area 351, it is possible to obtain an image capturing an area in which the feature points used for self-localization are easily extracted.

When the horizontal camera 253a to be used is selected by the camera selection determination unit 201, the processing proceeds to step S14. In step S14, self-localization processing using the horizontal camera 253a is performed. The self-localization processing performed in step S14 will be described with reference to the flowchart shown in FIG. 9.

In step S51, the shutter controller 202 controls the selected horizontal camera 253a to capture an image. The captured image is supplied to the feature matching unit 204. In the imaging, since only the selected horizontal camera 253a performs imaging, it is possible to reduce power consumption for the imaging. Additionally, since the image from the selected horizontal camera 253a is processed, the number of images to be processed to perform processing such as extraction of feature points can be reduced and the processing load can be reduced, for example.

In step S52, the feature matching unit 204 extracts feature points. On the other hand, in step S53, the feature point estimation unit 203 reads the surrounding environment information held in the self-location holding unit 206. The surrounding environment information includes information regarding feature points extracted from an image one frame earlier. In step S54, the feature point estimation unit 203 estimates at which position the feature points extracted from the image one frame earlier are located on the image captured by the selected horizontal camera 253a.

As described with reference to FIG. 4, the processing performed by the feature point estimation unit 203 in steps S53 and S54 is processing of estimating (converting) at which position the feature points extracted from an image one frame earlier are located in an image of the current frame.

In step S55, the feature matching unit 204 detects a corresponding pair by performing block matching between the feature points extracted from the image one frame earlier and the feature points extracted from the image of the current frame.

The image captured by the horizontal camera 253a is a landscape around the vehicle, and includes, for example, a building, a tree, a guardrail, and the like. Since block matching is suitable for matching processing for such a landscape image, the description herein will be continued on the assumption that the matching processing is performed by block matching.

Note that it is also possible to use a matching method other than block matching as the matching processing using the image captured by the horizontal camera 253a.

Additionally, while the description herein is given that the feature points are extracted to perform matching processing, information suitable for matching processing using the image captured by the horizontal camera 253a is extracted. For example, a case where an area with a feature is extracted instead of a point is also the application range of the present technology.

By performing block matching by the feature matching unit 204, information on a corresponding pair of feature points is generated and supplied to the self-localization unit 205. The self-localization unit 205 estimates the self-location in step S56. Any method of self-localizing can be applied to the present technology.

For example, as algorithms for estimating the posture from 2D-3D corresponding points (corresponding points between two-dimensional coordinates of image and three-dimensional coordinates of image) as the matching result, the direct linear transform (DLT) method, the perspective-N-points (PNP) method, and the like are generally known, and the self-localization unit 205 can estimate the self-location and the self-posture by these methods.

Additionally, the feature matching unit 204 performs matching by a matching method suitable for the method used by the self-localization unit 205, and outputs a matching result.

In this way, when traveling at high speed, the horizontal camera 253a performs imaging, and self-localization using the captured image is performed. Additionally, matching is performed using a matching method suitable for the image captured by the horizontal camera 253a.

The description returns to the flowchart of FIG. 7. In step S11, if it is determined that the moving speed of the vehicle is not equal to or higher than the threshold value, in other words, if it is determined to be low speed, the processing proceeds to step S15.

In step S15, the downward camera 253b is selected as the camera to be used. In a case where the downward camera 253b is selected, all of the downward cameras 253b mounted, in this case, eight downward cameras 253b are used. Since the downward camera 253b is mounted downward with respect to the vehicle, the downward camera 253b mainly captures an image of the road surface.

Since patterns based on the degree of reflection of light and the like due to unevenness on the road surface, that is, the brightness patterns on the road surface are detected and matching is performed according to the brightness patterns, in order to improve and maintain accuracy, the description herein will be continued assuming that all of the mounted downward cameras 253b are used.

Note that, as in the case where the horizontal camera 253a is selected, it is also possible to use weighted information held in the omnidirectional information holding unit 209, and set the downward camera 253b corresponding to the area from which feature points are easily extracted as the downward camera 253b to be used.

Additionally, it is also possible to select the downward camera 253b mounted on the moving direction side according to the moving direction of the vehicle. For example, when the vehicle is moving forward, the downward cameras 253b-1, 253b-2, 253b-5, 253b-6 arranged in the front may be used, and when the vehicle is moving backward, the downward cameras 253b-3, 253b-4, 253b-7, and 253b-8 arranged at the back may be used.

In step S16, self-localization processing using the downward camera 253b is performed. The self-localization processing using the downward camera 253b performed in step S16 will be described with reference to the flowchart shown in FIG. 10.

Figure 9:
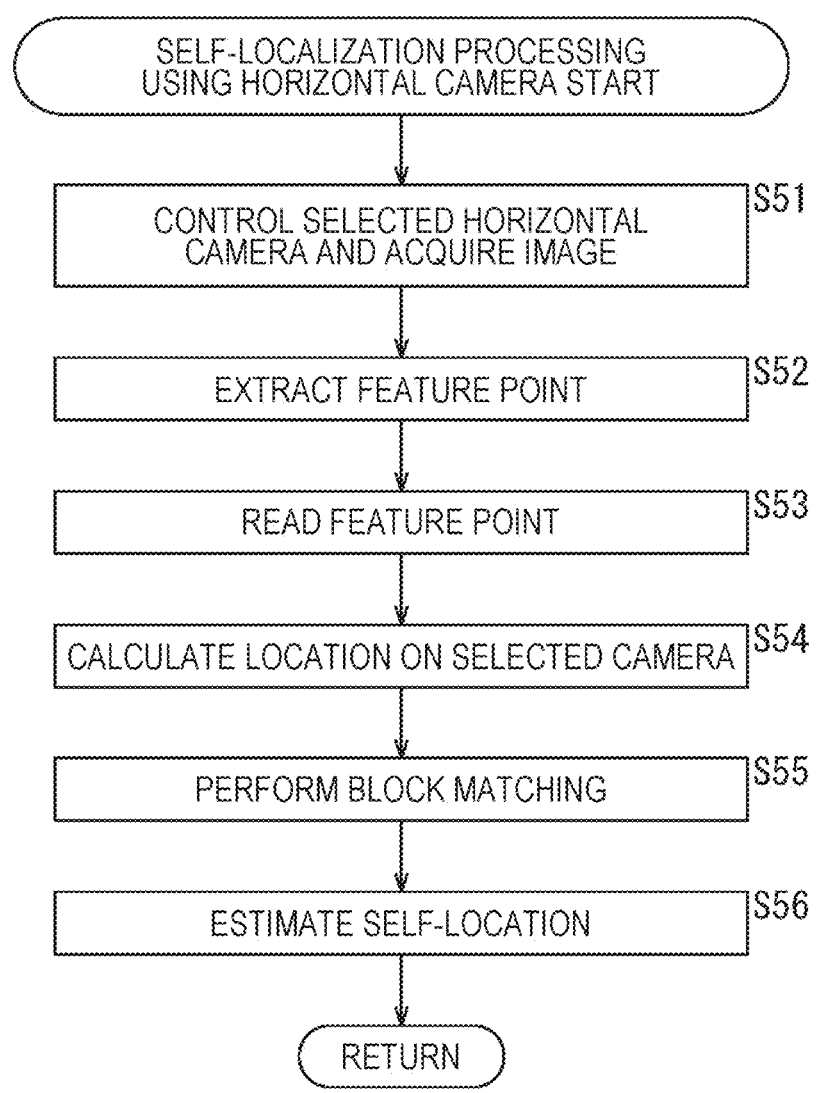
FIG. 9 is a flowchart for describing processing of the self-localization unit.
Figure 10:
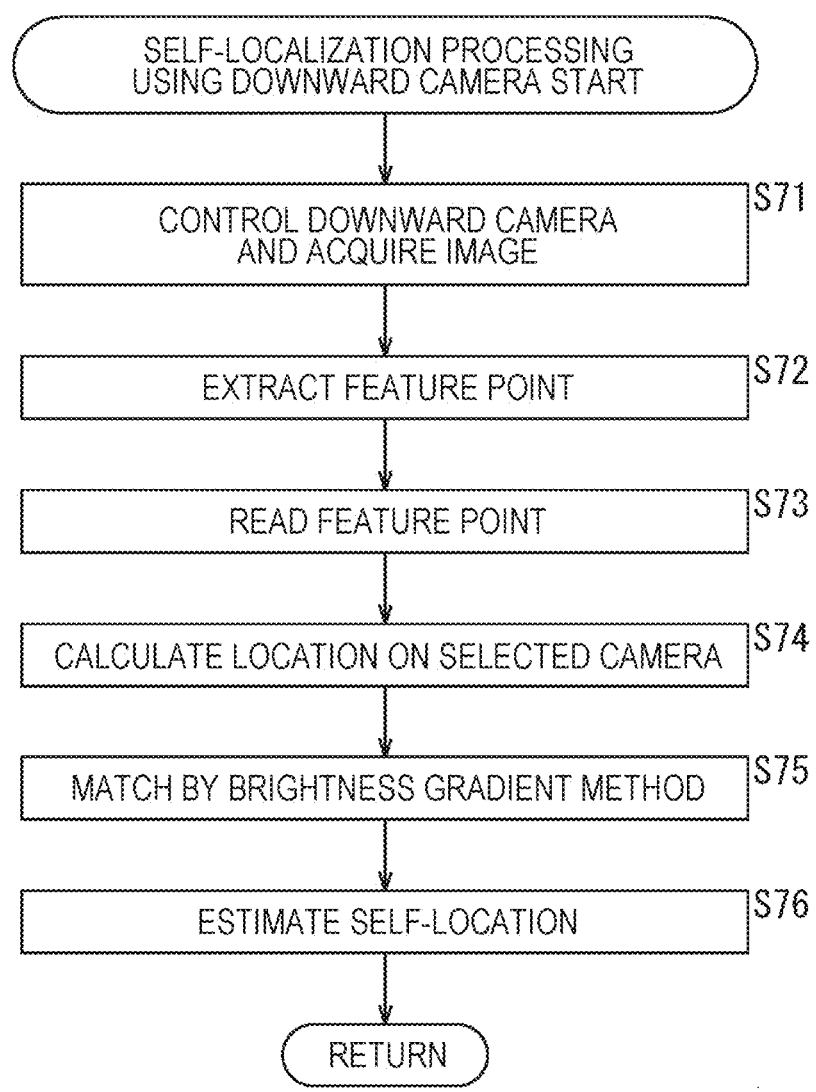
FIG. 10 is a flowchart for describing processing of the self-localization unit.

The self-localization processing using the downward camera 253b shown in FIG. 10 is basically similar to the self-localization processing using the horizontal camera 253a shown in FIG. 9.

In step S71, the shutter controller 202 controls the selected downward camera 253b, in this case, eight downward cameras 253b, and imaging is performed. The captured image is supplied to the feature matching unit 204. In step S72, the feature matching unit 204 extracts feature points. The feature point may be a pattern of the brightness of light on the road surface.

In step S73, the feature point estimation unit 203 reads the surrounding environment information held in the self-location holding unit 206. The surrounding environment information includes information regarding feature points extracted from an image one frame earlier. In step S74, the feature point estimation unit 203 estimates at which position the feature points extracted from the image one frame earlier are located on the image captured by the selected downward camera 253b.

As described with reference to FIG. 4, the processing performed by the feature point estimation unit 203 in steps S73 and S74 is processing of estimating (converting) at which position the feature points extracted from an image one frame earlier are located in an image of the current frame.

Alternatively, in a case where the downward camera 253b is used, since all of the mounted downward cameras 253b are used, as a result, a 360-degree image around the vehicle is captured. In other words, by performing imaging with all the downward cameras 253b, it is possible to capture a 360-degree image around the vehicle as in the case of the omnidirectional camera 252.

Accordingly, as in the case of processing the image of the omnidirectional camera 252, as described with reference to FIGS. 5 and 6, the images of the eight downward cameras 253b may be processed to obtain the moving direction of the feature points and obtain a corresponding pair.

In step S75, the feature matching unit 204 detects a corresponding pair by performing a brightness gradient method matching between the feature points extracted from the image one frame earlier and the feature points extracted from the image of the current frame.

A brightness pattern is extracted from the image captured by the downward camera 253b. Since matching by the brightness gradient method is suitable for matching processing using the brightness pattern, the description herein will be continued assuming that the matching processing by the brightness gradient method is performed.

Note that it is also possible to use a matching method other than the brightness gradient method as the matching processing using the image captured by the downward camera 253b.

Additionally, while the description herein is given that the brightness patterns (feature points) are extracted to perform matching processing, information suitable for matching processing using the image captured by the downward camera 253b is extracted. For example, a case where an area with a feature is extracted instead of a point is also the application range of the present technology.

By performing the brightness gradient method matching by the feature matching unit 204, information on a corresponding pair of feature points is generated and supplied to the self-localization unit 205. The self-localization unit 205 estimates the self-location in step S76. Any method of self-localizing can be applied to the present technology.

As described above, the algorithm of self-localization when the horizontal camera 253a is selected (matching method used by feature matching unit 204) and the algorithm of self-localization when the downward camera 253b is selected (matching method used by feature matching unit 204) are different algorithms, and an algorithm suitable for the captured image is applied. Hence, self-localization can be performed with higher accuracy.

Additionally, in this way, which camera to be used among the mounted cameras is selected depending on the speed. Additionally, a camera that captures an image from which features are easily extracted is selected. By selecting the camera in such a manner, it is possible to reduce power consumption required for imaging and reduce the processing load for processing the captured image.

Additionally, according to the present technology, even if power consumption and the processing load are reduced, the accuracy of self-localization does not decrease, and accurate self-localization can be performed.

In the above description, the case where the present technology is applied to a passenger car (automobile) is taken as an example. However, the present technology is applicable to automobiles such as electric vehicles and hybrid electric vehicles, as well as moving bodies such as motorcycles, bicycles, electric wheelchairs, personal mobility, airplanes, ships, and robots.

Computer Configuration Example

Incidentally, the series of processing described above can be performed by hardware or software. In a case where the series of processing is performed by software, a program that is included in the software is installed on a computer. Here, the computer includes a computer incorporated in dedicated hardware, a general-purpose personal computer, for example, that can execute various functions by installing various programs, and the like.

Figure 11:
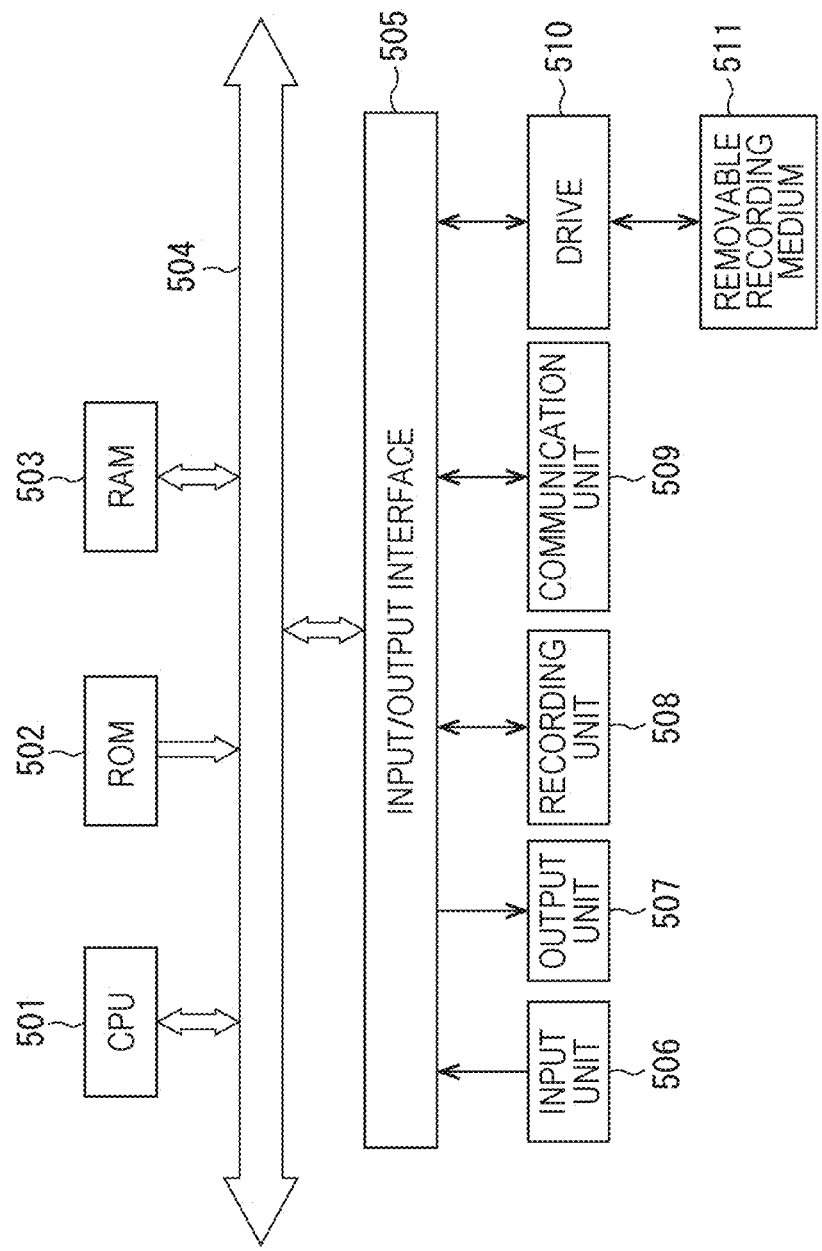
FIG. 11 is a diagram for describing a configuration of a computer.

FIG. 11 is a block diagram showing a hardware configuration example of a computer that executes the series of processing described above according to a program.

In a computer, a central processing unit (CPU) 501, a read only memory (ROM) 502, and a random access memory (RAM) 503 are mutually connected by a bus 504.

An input/output interface 505 is also connected to the bus 504. An input unit 506, an output unit 507, a recording unit 508, a communication unit 509, and a drive 510 are connected to the input/output interface 505.

The input unit 506 includes an input switch, a button, a microphone, an image sensor, and the like. The output unit 507 includes a display, a speaker, and the like. The recording unit 508 includes a hard disk, a nonvolatile memory, and the like. The communication unit 509 includes a network interface and the like. The drive 510 drives a removable recording medium 511 such as a magnetic disk, an optical disk, a magneto-optical disk, or a semiconductor memory.

In the computer configured as described above, for example, the CPU 501 loads a program stored in the recording unit 508 to the RAM 503 through the input/output interface 505 and the bus 504, and executes the program to perform the above-described series of processing.

The program executed by the computer (CPU 501) can be provided by being recorded on the removable recording medium 511 such as a package medium, for example. Additionally, the program can be provided through a wired or wireless transmission medium such as a local area network, the Internet, or digital satellite broadcasting.

In the computer, the program can be installed in the recording unit 508 through the input/output interface 505 by attaching the removable recording medium 511 to the drive 510. Additionally, the program can be received by the communication unit 509 through a wired or wireless transmission medium and be installed in the recording unit 508. In addition, the program can be installed in advance in the ROM 502 or the recording unit 508.

Note that the program executed by the computer may be a program that performs processing in chronological order according to the order described in the present specification, or a program that performs processing in parallel, or at a necessary timing such as when a call is made.

Additionally, the embodiment of the present technology is not limited to the above-described embodiment, and various modifications can be made without departing from the scope of the present technology.

For example, the present technology can have a cloud computing configuration in which one function is shared and processed by multiple devices through a network.

Additionally, each step described in the above-described flowchart can be executed by one device or be executed in a shared manner by multiple devices.

Moreover, in a case where multiple processes are included in one step, the multiple processes included in one step can be executed by one device or be executed in a shared manner by multiple devices.

Moreover, the present technology may have the following configurations.

(1)

A controller including a selection unit that selects, from a horizontal camera mounted in a horizontal direction and a downward camera mounted in a downward direction, a camera used for self-localization depending on speed, and a self-localization unit that performs self-localization using an image obtained by imaging with the horizontal camera or the downward camera selected by the selection unit.

(2)

The controller according to (1) above, in which the selection unit selects the horizontal camera in a case where the speed is equal to or higher than a predetermined speed, and selects the downward camera in a case where the speed is not equal to or higher than the predetermined speed.

(3)

The controller according to (2) above, in which the selection unit selects a horizontal camera predicted to capture an area from which features are easily extracted from among the multiple horizontal cameras.

(4)

The controller according to (3) above further including a setting unit that sets the area from which features are easily extracted, and an omnidirectional camera that captures an image of surroundings of the omnidirectional camera, in which the setting unit divides an image captured by the omnidirectional camera by the number of the horizontal cameras, and selects the horizontal camera that images an area including a large number of feature points in which a direction that the feature point extracted from each of the divided images moves over time matches a self-moving direction based on a self-localization result.

(5)

The controller according to any one of (1) to (4) above, in which a first algorithm for self-localization in a case where the horizontal camera is selected by the selection unit and a second algorithm for self-localization in a case where the downward camera is selected by the selection unit are different algorithms.

(6)

The controller according to (5) above, in which the first algorithm is block matching, and the second algorithm is a brightness gradient method.

(7)

The controller according to any one of (1) to (6) above, in which a certain position imaged by the horizontal camera selected at a current time is estimated, the certain position corresponding to a position of a feature point extracted from an image captured by the horizontal camera at a time before the current time.

(8)

A control method including a controller performing selection processing between a horizontal camera mounted in a horizontal direction and a downward camera mounted in a downward direction to select a camera used for self-localization depending on speed, and the controller performing self-localization processing using an image obtained by imaging with the horizontal camera or the downward camera selected by the selection unit.

(9)

A program for causing a computer to perform processing including selecting, from a horizontal camera mounted in a horizontal direction and a downward camera mounted in a downward direction, a camera used for self-localization depending on speed, and performing self-localization using an image obtained by imaging with the horizontal camera or the downward camera selected by the selection unit.

REFERENCE SIGNS LIST

100 Vehicle control system
101 Input unit
102 Data acquisition unit
103 Communication unit
104 In-vehicle device
105 Output controller
106 Output unit
107 Drive line controller
108 Drive line system
109 Body line controller
110 Body line system
111 Storage unit
112 Automatic operation controller
121 Communication network
131 Detection unit
132 Self-localization unit
133 Situation analysis unit
134 Planning unit
135 Motion controller
141 Outside information detection unit
142 Inside information detection unit
143 Vehicle state detection unit
151 Map analysis unit
152 Traffic rule recognition unit
153 Situation recognition unit
154 Situation prediction unit
161 Route planning unit
162 Behavior planning unit
163 Motion planning unit
171 Emergency avoidance unit
172 Acceleration/deceleration controller
173 Direction controller
201 Camera selection determination unit
202 Shutter controller
203 Feature point estimation unit
204 Feature matching unit
205 Self-localization unit
206 Self-location holding unit
207 Motion prediction unit
208 Feature matching unit
209 Omnidirectional information holding unit
210 Area weight determination unit
251 Controller
252 Omnidirectional camera
253 Peripheral camera
301 Image
311 Feature point
351 Image
352 Image
371 Feature point

The invention claimed is:

1. A controller comprising:
   circuitry configured to:
   select, depending on speed, one of a plurality of horizontal cameras mounted in a horizontal direction or a downward camera mounted in a downward direction for self-localization,
   divide an image captured by an omnidirectional camera into a plurality of divided images corresponding to a number of the plurality of horizontal cameras, wherein the image comprises surroundings of the omnidirectional camera,
   extract a plurality of feature points from the plurality of divided images, and
   in a case that one of the plurality of horizontal cameras is selected for self-localization, select a particular horizontal camera from the plurality of horizontal cameras that images an area including a large number of the plurality of feature points that move over time in a direction that matches a self-moving direction, and perform self-localization using the particular horizontal camera.

2. The controller according to claim 1, wherein the circuitry is further configured to:
   select the horizontal camera in a case where the speed is equal to or higher than a predetermined speed, and select the downward camera in a case where the speed is not equal to or higher than the predetermined speed.

3. The controller according to claim 2, wherein the circuitry is further configured to:
   select the particular horizontal camera predicted to capture an area from which features are easily extracted from among the plurality of horizontal cameras.

4. The controller according to claim 1, wherein the circuitry is further configured to:
   use a first algorithm for self-localization in a case where the particular horizontal camera is selected and use a second algorithm for self-localization in a case where the downward camera is selected,
   wherein the first algorithm and the second algorithm are different algorithms.

5. The controller according to claim 4, wherein
   the first algorithm is block matching, and the second algorithm is a brightness gradient method.

6. The controller according to claim 1, wherein
   a certain position imaged by the particular horizontal camera selected at a current time is estimated, the certain position corresponding to a position of a particular feature point extracted from a second image captured by the particular horizontal camera at a time before the current time.

7. A control method comprising:
   selecting, depending on speed, one of a plurality of horizontal cameras mounted in a horizontal direction or a downward camera mounted in a downward direction for self-localization,
   dividing an image captured by an omnidirectional camera into a plurality of divided images corresponding to a number of the plurality of horizontal cameras, wherein the image comprises surroundings of the omnidirectional camera,
   extracting a plurality of feature points from the plurality of divided images, and
   in a case that one of the plurality of horizontal cameras is selected for self-localization, selecting a particular horizontal camera from the plurality of horizontal cameras that images an area including a large number of the plurality of feature points that move over time in a direction that matches a self-moving direction, and performing self-localization using the particular horizontal camera.

8. A program comprising computer readable instructions stored on a non-transitory computer readable medium, the program for causing a computer to perform processing comprising:

selecting, depending on speed, one of a plurality of horizontal cameras mounted in a horizontal direction or a downward camera mounted in a downward direction for self-localization, dividing an image captured by an omnidirectional camera into a plurality of divided images corresponding to a number of the plurality of horizontal cameras, wherein the image comprises surroundings of the omnidirectional camera, extracting a plurality of feature points from the plurality of divided images, and in a case that one of the plurality of horizontal cameras is selected for self-localization, selecting a particular horizontal camera from the plurality of horizontal cameras that images an area including a large number of the plurality of feature points that move over time in a direction that matches a self-moving direction, and performing self-localization using the particular horizontal camera.

* * * * *